(12) United States Patent
Terada et al.

(10) Patent No.: US 12,145,587 B2
(45) Date of Patent: Nov. 19, 2024

(54) LEANING VEHICLE WITH A STEERABLE FRONT WHEEL

(71) Applicants: YAMAHA HATSUDOKI KABUSHIKI KAISHA, Iwata (JP); AISIN CORPORATION, Kariya (JP)

(72) Inventors: Keisuke Terada, Shizuoka (JP); Toshifumi Uchiyama, Shizuoka (JP); Keizo Araki, Aichi (JP); Shota Kubo, Aichi (JP)

(73) Assignees: YAMAHA HATSUDOKI KABUSHIKI KAISHA, Iwata (JP); AISIN CORPORATION, Kariya (JP)

(*) Notice: Subject to any disclaimer, the term of this patent is extended or adjusted under 35 U.S.C. 154(b) by 740 days.

(21) Appl. No.: 17/358,885

(22) Filed: Jun. 25, 2021

(65) Prior Publication Data
US 2021/0316730 A1 Oct. 14, 2021

Related U.S. Application Data

(63) Continuation-in-part of application No. PCT/JP2019/051361, filed on Dec. 27, 2019.

(30) Foreign Application Priority Data

Dec. 27, 2018 (JP) .............................. 2018-244825

(51) Int. Cl.
*B62K 5/027* (2013.01)
*B60W 30/18* (2012.01)
(Continued)

(52) U.S. Cl.
CPC ....... *B60W 30/18009* (2013.01); *B62K 5/027* (2013.01); *B62K 5/05* (2013.01);
(Continued)

(58) Field of Classification Search
CPC ....... B60W 30/18009; B60W 2520/10; B60W 2520/18; B62K 5/027; B62K 5/05; B62K 5/08
See application file for complete search history.

(56) References Cited

U.S. PATENT DOCUMENTS

| | | | |
|---|---|---|---|
| 2014/0019006 A1* | 1/2014 | Bruce | B60W 30/18145 701/41 |
| 2017/0291637 A1* | 10/2017 | Horiguchi | B62K 5/10 |
| 2018/0237065 A1* | 8/2018 | Yamamoto | B60G 21/007 |

FOREIGN PATENT DOCUMENTS

| | | | |
|---|---|---|---|
| JP | 2012153349 A | 8/2012 | |
| JP | 2012166636 A | 9/2012 | |

(Continued)

*Primary Examiner* — Jacob D Knutson
(74) *Attorney, Agent, or Firm* — Rabin & Berdo, P.C.

(57) ABSTRACT

A leaning vehicle including a vehicle body, a steerable front wheel set swivelable around an axis extending in an up-down direction, a rear wheel set, a turn operation input device that receives a turn operation and transmits the turn operation non-mechanically, a leaning device including a lean actuator that leans the vehicle body, the steerable front wheel set and the rear wheel set to a leftward or rightward direction, and a centripetal force generator including a centripetal force generation actuator, which outputs a controllable torque to thereby generate an additional centripetal force that acts on the steerable front wheel set and the rear wheel set during a turn of the leaning vehicle. The controller controls the torque while controlling the lean actuator in accordance with the received turn operation, to thereby control a leaning condition of the vehicle body during the turn and to control generation of the additional centripetal force.

13 Claims, 9 Drawing Sheets

(51) Int. Cl.
*B62K 5/05* (2013.01)
*B62K 5/08* (2006.01)

(52) U.S. Cl.
CPC ........... *B62K 5/08* (2013.01); *B60W 2520/10* (2013.01); *B60W 2520/18* (2013.01)

(56) References Cited

FOREIGN PATENT DOCUMENTS

| | | | |
|---|---|---|---|
| JP | 2013112238 | A | 6/2013 |
| JP | 2013144471 | A | 7/2013 |
| JP | 2016165986 | A | 9/2016 |
| JP | 2017177905 | A | 10/2017 |
| JP | 2018135001 | A | 8/2018 |
| WO | 2017194688 | A1 | 11/2017 |

* cited by examiner

LEANING VEHICLE WITH A STEERABLE FRONT WHEEL

CROSS-REFERENCE TO RELATED APPLICATIONS

This is a continuation-in-part application of International Application PCT/JP2019/051361 filed on Dec. 27, 2019, which claims priority from a Japanese Patent Application No. 2018-244825, filed on Dec. 27, 2018. The contents of the applications are incorporated herein by reference.

TECHNICAL FIELD

The present teaching relates to a leaning vehicle, and more particularly to a leaning vehicle with a steerable front wheel.

BACKGROUND ART

There exist leaning vehicles. A leaning vehicle, for example, includes a vehicle body, a plurality of wheels, a turn operation input device, a steerable wheel controller, and a vehicle body leaning device. The plurality of wheels includes at least one front wheel and at least one rear wheel. The steerable wheel of the leaning vehicle is the front wheel. The front wheel is supported by the vehicle body in such a manner so as to be able to swivel around an axis extending in a vehicle-body's up-down direction. The number of front wheels is one or two. The number of rear wheels is two when the number of front wheels is one, and the number of rear wheels is one or two when the number of front wheels is two. The turn operation input device receives an operation to turn the leaning vehicle by the rider. The turn operation input device is a handlebar. The steerable wheel controller controls the steering angle of the steerable wheel in accordance with the input from the turn operation input device. When the operation inputted to the turn operation input device is an operation to turn the leaning vehicle leftward, the vehicle body leaning device leans the vehicle body leftward. Also, when the operation inputted to the turn operation input device is an operation to turn the leaning vehicle rightward, the vehicle body leaning device leans the vehicle body rightward. Such a leaning vehicle is disclosed, for example, in Japanese Patent Application Publication No. 2017-177905.

CITATION LIST

Patent Literature

Patent Literature 1: Japanese Patent Application Publication No. 2017-177905

SUMMARY OF INVENTION

Technical Problem

The above-mentioned publication implies that instead of the handlebar, an electric turn operation input device, such as a jog dial, a touch panel, a press-button device or the like, can be used as the turn operation input device with which the rider inputs an instruction for turning (see paragraph 0036). Such an electric turn operation input device is a turn operation input device that is configured to receive a rider's input to turn the leaning vehicle without transmitting the turn operation mechanically, thus preventing the steerable front wheel from swiveling due to mechanical transmission of the turn operation.

When such a turn operation input device that is configured to not transmit a turn operation mechanically and thereby prevents the steerable front wheel from swiveling due to mechanical transmission of the turn operation is used, the leaning vehicle is controlled by an actuator to turn in accordance with the turn operation. Thus, a leaning vehicle that has such a turn operation input device that is configured to not transmit a turn operation mechanically and thereby prevents the steerable front wheel from swiveling due to mechanical transmission of the turn operation is controlled by an actuator in accordance with the turn operation, and therefore, it is preferable that the leaning vehicle has higher robustness to turning.

An objective of the present teaching is to provide a leaning vehicle with a steerable front wheel, including a turn operation input device that is configured to not transmit a turn operation mechanically and thereby prevents the steerable front wheel from swiveling due to mechanical transmission of the turn operation and showing enhanced robustness to turning.

Solution to Problem

A leaning vehicle with a steerable front wheel according to an embodiment of the present teaching includes: a vehicle body; one or two steerable front wheels that are supported by the vehicle body in such a manner so as to be able to swivel around an axis extending in a vehicle-body's up-down direction; one or two rear wheels that are supported by the vehicle body in such a manner so as to be unable to swivel around an axis extending in the vehicle-body's up-down direction, the number of the rear wheels being two when the number of the steerable front wheels is one, and the number of the rear wheels being one or two when the number of the steerable front wheels is two. The leaning vehicle with a steerable front wheel according to the embodiment of the present teaching further includes a turn operation input device that receives an operation to turn the leaning vehicle by the rider and is not mechanically connected to the one or two steerable front wheels such that the one or two steerable front wheels do not swivel due to mechanical transmission of the turn operation inputted by the rider. The leaning vehicle with a steerable front wheel according to the embodiment of the present teaching further includes a leaning device, within which includes a lean actuator that leans the vehicle body, the one or two steerable front wheels and the one or two rear wheels in a vehicle's leftward direction when the turn operation inputted to the turn operation input device is a turn operation to turn the leaning vehicle in the vehicle's leftward direction, and leans the vehicle body, the one or two steerable front wheels and the one or two rear wheels in a vehicle's rightward direction when the turn operation inputted to the turn operation input device is a turn operation to turn the leaning vehicle in the vehicle's rightward direction; and a controller that controls the lean actuator.

As mentioned above, the leaning vehicle with a steerable front wheel according to the embodiment of the present teaching is a three-wheeled vehicle or a four-wheeled vehicle. In the leaning vehicle with a steerable front wheel according to the embodiment of the present teaching, the number of steerable front wheels or the number of rear wheels is two. The leaning vehicle with a steerable front wheel according to the embodiment of the present teaching turns with the vehicle body, the one or two front steerable wheels and the one or two rear wheels leaned by the leaning device and the controller. The turn operation input device is configured to not transmit the turn operation to the one or two steerable front wheels mechanically and thereby prevents the one or two steerable front wheels from swiveling due to mechanical transmission of the turn operation. The leaning vehicle with a steerable front wheel is controlled by a lean actuator in accordance with the turn operation, and therefore, it is preferable that the leaning vehicle has higher robustness to turning.

The leaning vehicle with a steerable front wheel furthermore includes a centripetal force generator including a centripetal force generation actuator that outputs torque that is controllable to generate an additional centripetal force that acts on the one or two steerable front wheels and the one or two rear wheels while the one or two steerable front wheels and the one or two rear wheels are leaning during a turn of the leaning vehicle. The controller controls the torque outputted from the centripetal force generation actuator while controlling the lean actuator in accordance with the turn operation inputted to the turn operation input device, and thereby controls a leaning condition of the vehicle body during the turn of the leaning vehicle and the centripetal force acting on the one or two steerable front wheels and the one or two rear wheels during the turn of the leaning vehicle.

Thus, the leaning condition of the vehicle body during a turn of the leaning vehicle is controlled by the lean actuator, which leans the vehicle body in accordance with the turn operation, and the centripetal force acting on the one or two steerable front wheels and the one or two rear wheels is controlled by the centripetal force generation actuator, which generates an additional centripetal force that acts on the one or two steerable front wheels and the one or two rear wheels while these wheels are leaning during a turn of the leaning vehicle. By these controls, a turn of the leaning vehicle with a steerable front wheel can be controlled. Therefore, the leaning vehicle with a steerable front wheel, the leaning vehicle including a turn operation input device that is configured to not transmit a turn operation inputted by the rider to the steerable front wheel mechanically and thereby prevents the steerable front wheel from swiveling due to mechanical transmission of the turn operation inputted by the rider, shows enhanced robustness to turning.

The controller of the leaning vehicle controls the torque outputted from the centripetal force generation actuator while controlling the lean actuator in accordance with the turn operation inputted to the turn operation input device. Accordingly, for example, the controller controls the torque outputted from the steering actuator while controlling the lean actuator to keep the lean angle of the vehicle body at an angle in accordance with the turn operation inputted to the turn operation input device.

While the one or two steerable front wheels and the one or two rear wheels are leaning by control of the lean actuator in accordance with the turn operation, the centripetal force acting on these wheels is controlled by control of the torque outputted from the centripetal force generation actuator. Accordingly, the centripetal force can be controlled easily while the leaning condition of the vehicle body is controlled by the lean actuator in accordance with the turn operation. Therefore, the leaning vehicle with a steerable front wheel, including a turn operation input device that is configured to not transmit a turn operation inputted by the rider to the steerable front wheel mechanically and thereby prevents the steerable front wheel from swiveling due to mechanical transmission of the turn operation inputted by the rider, shows enhanced robustness to turning.

In the leaning vehicle with a steerable front wheel according to an embodiment of the present teaching, the vehicle body is not particularly limited, as long as the vehicle body is configured to lean in a vehicle's leftward direction, which is a direction to the left of the leaning vehicle with a steerable front wheel, when the leaning vehicle with a steerable wheel turns in the vehicle's leftward direction and to lean in a vehicle's rightward direction, which is a direction to the right of the leaning vehicle with a steerable front wheel, when the leaning vehicle with a steerable wheel turns in the vehicle's rightward direction. The vehicle body includes a vehicle body frame. The vehicle body frame may be a frame made by assembly of a plurality of parts or a frame made by integral forming. The material of the vehicle body frame may be a metal such as aluminum, iron or the like, a synthetic resin, or a combination of a metal and a resin. The vehicle body frame may be a monocoque type that is formed of exterior parts of the leaning vehicle with a steerable front wheel or may be a semi-monocoque type, part of which also functions as an exterior part of the leaning vehicle with a steerable front wheel.

In the leaning vehicle with a steerable front wheel according to the embodiment of the present teaching, the one or two steerable front wheels are not particularly limited, as long as the one or two steerable front wheels are able to swivel around an axis extending in a vehicle-body's up-down direction, which is a direction along an upward and downward direction of the vehicle body. The axis extending in the vehicle-body's up-down direction does not necessarily extend in the vertical direction when the vehicle body is in an upright state. The axis extending in the vehicle-body's up-down direction may be inclined from the vertical direction toward the back of the vehicle body when the vehicle body is in an upright state. The way in which the one or two steerable front wheels are supported by the vehicle body is not particularly limited. For example, the one or two steerable front wheels may be supported by the vehicle body directly or may be supported by the vehicle body indirectly. The way in which the one or two steerable front wheels are supported by the vehicle body indirectly includes, for example, a case of using a suspension mechanism that is positioned between the one or two steerable front wheels and the vehicle body and supports the one or two steerable front wheels relative to the vehicle body. A suspension mechanism that supports one steerable front wheel is, for example, a telescopic type or bottom link type front fork. A suspension mechanism that supports two steerable front wheels is, for example, an independent suspension. The two steerable front wheels are, for example, arranged side by side in the left-right direction of the leaning vehicle with a steerable front wheel.

In the leaning vehicle with a steerable front wheel according to the embodiment of the present teaching, the way in which the one or two rear wheels are supported by the vehicle body is not particularly limited, as long as the one or two rear wheels are supported in such a manner so as to be unable to swivel around an axis extending in the vehicle-body's up-down direction. The one or two rear wheels, for example, may be supported by the vehicle body directly or may be supported by the vehicle body indirectly. The way in which the one or two rear wheels are supported by the vehicle body indirectly includes, for example, a case of using a suspension mechanism that is positioned between the one or two rear wheels and the vehicle body and supports the one or two rear wheels relative to the vehicle body. A suspension mechanism that supports one rear wheel is, for example, a swingarm suspension. A suspension mechanism that supports two rear wheels is, for example, an independent suspension. The two rear wheels are, for example, arranged side by side in the left-right direction of the leaning vehicle with a steerable front wheel.

In the leaning vehicle with a steerable front wheel according to the embodiment of the present teaching, the turn operation input device is not particularly limited, as long as the turn operation input device is configured to receive a turn operation to turn the leaning vehicle by the rider and to not transmit the turn operation to the one or two steerable front wheels mechanically and thereby prevents the one or two steerable front wheels from swiveling due to mechanical transmission of the turn operation. The rider inputs such a turn operation to turn the leaning vehicle, for example, by using a part of the rider's body (for example, by hand). The way in which the turn operation input device receives a turn operation by the rider is not particularly limited. For example, when the rider inputs a turn operation to turn the leaning vehicle by using a part of the rider's body (for example, by hand), the turn operation input device is only required to have a part to be touched by the rider with a part of his/her body (for example, a hand). In this case, the part of the turn operation input device receives a turn operation. The case in which the turn operation is not transmitted to the one or two steerable front wheels mechanically and thereby prevents the one or two steerable front wheels from swiveling due to mechanical transmission of the turn operation includes, for example, a case in which the turn operation input device is not mechanically connected to the one or two steerable front wheels. The case in which the turn operation input device is not mechanically connected to the one or two steerable front wheels includes, for example, a case in which power cannot be transmitted from the turn operation input device to the one or two steerable front wheels. When the turn operation input device is not mechanically connected to the one or two steerable wheels, it is necessary, for example, to generate an electric signal in accordance with the turn operation inputted by the rider and drive an actuator by using the electric signal to swivel the one or two steerable front wheels.

In the leaning vehicle with a steerable front wheel according to the embodiment of the present teaching, the leaning device is not particularly limited, as long as the leaning device includes a lean actuator that leans the vehicle body, the one or two steerable front wheels and the one or two rear wheels in the vehicle's leftward direction when the turn operation inputted to the turn operation input device is a turn operation to turn the leaning vehicle in the vehicle's leftward direction, and leans the vehicle body, the one or two steerable front wheels and the one or two rear wheels in a vehicle's rightward direction when the turn operation inputted to the turn operation input device is a turn operation to turn the leaning vehicle in the vehicle's rightward direction. The way in which the lean actuator leans the vehicle body, the one or two steerable wheels and the one or two rear wheels in the vehicle's leftward direction or the vehicle's rightward direction is not particularly limited. For example, the lean actuator may lean the vehicle body in the vehicle's leftward direction or the vehicle's rightward direction and thereby lean the one or two steerable front wheels and the one or two rear wheels supported by the vehicle body in the vehicle's leftward direction or the vehicle's rightward direction together with the vehicle body. The lean actuator, for example, may have an output member mechanically connected to the vehicle body. The way in which the output member is mechanically connected to the vehicle body, for example, includes a case in which power can be transmitted from the output member to the vehicle body. The lean actuator is, for example, an electric motor having an output member that is rotatable forward and in reverse.

In the leaning vehicle with a steerable front wheel according to the embodiment of the present teaching, the centripetal force generator is not particularly limited, as long as the centripetal force generator includes a centripetal force generation actuator that outputs torque that is controllable to generate an additional centripetal force that acts on the one or two steerable front wheels and the one or two rear wheels that are leaning during a turn of the leaning vehicle. An additional centripetal force that is generated during a turn of the leaning vehicle and acts on the one or two steerable front wheels and the one or two rear wheels that are leaning during the turn of the leaning vehicle, for example, is added to a centripetal force generated along with the turn of the leaning vehicle, and thereby, the centripetal force acting on the one or two steerable front wheels and the one or two rear wheels that are leaning during the turn of the leaning vehicle is further increased. A centripetal force generated along with a turn of the leaning vehicle is a centripetal force generated due to leaning of the one or two steerable front wheels and the one or two rear wheels during a turn of the leaning vehicle. A centripetal force generated due to leaning of the one or two steerable front wheels and the one or two rear wheels during a turn of the leaning vehicle is a centripetal force generated by a drive of the lean actuator to lean the one or two steerable front wheels and the one or two rear wheels during a turn of the leaning vehicle. Thus, an additional centripetal force that is generated during a turn of the leaning vehicle and acts on the one or two steerable front wheels and the one or two rear wheels that are leaning during the turn of the leaning vehicle is different from a centripetal force generated by a drive of the lean actuator to lean the one or two steerable front wheels and the one or two rear wheels during a turn of the leaning vehicle.

The way in which the centripetal generation actuator generates an additional centripetal force that acts on the one or two steerable front wheels and the one or two rear wheels is not particularly limited. The centripetal force generation actuator may include, for example, an actuator that generates an additional centripetal force that acts on one of the one or two steerable front wheels and the one or two rear wheels and consequently causes generation of an additional centripetal force acting on all of the one or two steerable front wheels and the one or two rear wheels. In other words, the centripetal force generation actuator may include an actuator that causes a time lag among actions of an additional centripetal force on the respective one or two steerable front wheels and the one or two rear wheels.

The centripetal force generation actuator may have, for example, an output member that is mechanically connected to any of the one or two steerable front wheels and the one or two rear wheels. The way in which the output member is mechanically connected to any of the one or two steerable front wheels and the one or two rear wheels includes, for example, a case in which power can be transmitted from the output member to any of the one or two steerable front wheels and the one or two rear wheels. The centripetal force generation actuator is, for example, an electric motor having an output member that is rotatable forward and in reverse.

When an additional centripetal force is to be generated and act on the one or two steerable front wheels, for example, the centripetal force generation actuator may apply torque to the one or two steerable front wheels to swivel the one or two steerable wheels around an axis extending in a vehicle's up-down direction. In other words, the centripetal force generation actuator may apply torque to a member that supports the one or two steerable front wheels such that the one or two steerable front wheels are able to swivel around an axis extending in the vehicle's up-down direction, and thereby swivel the one or two steerable front wheels around the axis. When the centripetal force generation actuator applies torque to two steerable right and left front wheels arranged in the vehicle's left-right direction, which is a direction to the left and right of the leaning vehicle with a steerable front wheel, the centripetal force generation actuator, for example, may apply different amounts of torque to the two steerable front wheels. One way of applying different amounts of torque to the two steerable front wheels is by, for example, applying a smaller amount of torque to one of the two steerable front wheels that is located at the inner side of the turning leaning vehicle than to the other steerable front wheel that is located at the outer side of the turning leaning vehicle. This way of applying different amounts of torque to the two steerable front wheels, for example, may be implemented by using a power unit that rotates the two steerable front wheels separately, or by a brake unit that applies brake power to the two steerable front wheels separately.

When the centripetal force generation actuator applies torque to two left and right rear wheels arranged in the vehicle's left-right direction, which is a direction to the left and right of the leaning vehicle with a steerable front wheel, the centripetal force generation actuator, for example, may apply different amounts of torque to the two rear wheels. One way of applying different amounts of torques to the two rear wheels is by, for example, applying a smaller amount of torque to one of the two rear wheels that is located at the inner side of the turning leaning vehicle than to the other rear wheel that is located at the outer side of the turning leaning vehicle. This way of applying different amounts of torque to the two rear wheels, for example, may be implemented by using a power unit that rotates the two rear wheels separately, or by a brake unit that applies brake power to the two rear wheels separately.

In the leaning vehicle with a steerable front wheel according to the embodiment of the present teaching, as long as the controller is configured to control the torque outputted from the centripetal force generation actuator while controlling the lean actuator in accordance with the turn operation inputted to the turn operation input device and thereby to control the leaning condition of the vehicle body during the turn of the leaning vehicle and the centripetal force acting on the one or two steerable front wheels and the one or two rear wheels, the controller is not particularly limited. In short, the controller is only required to control the torque outputted from the centripetal force generation actuator while controlling the lean actuator. The way in which the controller controls the lean actuator in accordance with the turn operation inputted to the turn operation input device includes, for example, controlling the lean actuator so as to change the lean angle of the vehicle body during the turn of the leaning vehicle when the vehicle speed of the leaning vehicle with a steerable wheel changes while the turn operation input remains unchanged.

In the leaning vehicle with a steerable front wheel according to the embodiment of the present teaching, the controller may control the torque outputted from the centripetal force actuator while controlling the position of the output member of the lean actuator in accordance with the turn operation inputted to the turn operation input device and thereby control the lean angle of the vehicle body during the turn of the leaning vehicle and the centripetal force acting on the one or two steerable front wheels and the one or two rear wheels during the turn of the leaning vehicle.

In the leaning vehicle with a steerable front wheel according to the embodiment of the present teaching, the controller may control the torque outputted from the centripetal force generation actuator in accordance with the turn operation inputted to the turn operation input device while controlling the lean actuator in accordance with the turn operation inputted to the turn operation input device and thereby control the leaning condition of the vehicle body during the turn of the leaning vehicle and the centripetal force acting on the one or two steerable front wheels and the one or two rear wheels during the turn of the leaning vehicle.

In this case, the torque outputted from the centripetal force generation actuator is controlled in accordance with the operation to turn the leaning vehicle with a steerable wheel, and therefore, the centripetal force acting on the two steerable front wheels and the rear wheel can be controlled more appropriately.

In the leaning vehicle with a steerable front wheel according to the embodiment of the present teaching, the turn operation input device may include a manipulable member that can be swiveled by the rider. In this case, the controller may control the torque outputted from the centripetal force generation actuator in accordance with a swivel angle of the manipulable member while controlling the lean actuator in accordance with the turn operation inputted to the turn operation input device and thereby control the leaning condition of the vehicle body during the turn of the leaning vehicle and the centripetal force acting on the one or two steerable front wheels and the one or two rear wheels during the turn of the leaning vehicle.

As long as the manipulable member of the turn operation input device is a member that can be manipulated by the rider to input an operation to turn the leaning vehicle, the manipulable member is not particularly limited. In other words, the manipulable member of the turn operation input device is only required to receive the rider's manipulation to turn the leaning vehicle.

The leaning vehicle with a steerable front wheel according to the embodiment of the present teaching may further include an in-motion state detector that detects a physical quantity relating to the in-motion state of the leaning vehicle with a steerable front wheel. In this case, the controller may control the torque outputted from the centripetal force generation actuator based on the in-motion state of the leaning vehicle with a steerable wheel detected by the in-motion state detector while controlling the lean actuator in accordance with the turn operation inputted to the turn operation input device and thereby control the leaning condition of the vehicle body during the turn of the leaning vehicle and the centripetal force acting on the one or two steerable front wheels and the one or two rear wheels during the turn of the leaning vehicle.

In this case, the torque outputted from the centripetal force generation actuator is controlled based on the in-motion state of the turning leaning vehicle with a steerable wheel, and therefore, the centripetal force acting on the two steerable front wheels and the rear wheel can be controlled more appropriately.

Alternatively, the controller may control the torque outputted from the centripetal force generation actuator based on the turn operation inputted to the turn operation input device and the in-motion state of the leaning vehicle with a steerable wheel detected by the in-motion state detector while controlling the lean actuator in accordance with the turn operation inputted to the turn operation input device and thereby control the leaning condition of the vehicle body during the turn of the leaning vehicle and the centripetal force acting on the one or two steerable wheels and the one or two steerable wheels during the turn of the leaning vehicle.

In this case, the torque outputted from the centripetal force generation actuator is controlled based on the operation to turn the leaning vehicle with a steerable front wheel and the in-motion state of the turning leaning vehicle with a steerable wheel, and therefore, the centripetal force acting on the two steerable front wheels and the rear wheel can be controlled more appropriately.

As long as the physical quantity relating to the in-motion state of the leaning vehicle with a steerable wheel is a physical quantity that poses information that contributes to the detection of the overall in-motion state of the leaning vehicle with a steerable front wheel, the physical quantity relating to the in-motion state is not particularly limited.

The in-motion state detector may detect any of the following (1), (2) and (3) as the physical quantity relating to the in-motion state of the leaning vehicle with a steerable front wheel:

(1) a physical quantity relating to the lean angle of the vehicle body;
(2) a physical quantity relating to the vehicle speed of the leaning vehicle with a steerable front wheel; and
(3) a physical quantity relating to the lateral acceleration of the vehicle body that is an acceleration of the vehicle body in a vehicle's left-right direction.

As long as the physical quantity relating to the lean angle of the vehicle body is a physical quantity that poses information that contributes to the detection of the lean angle of the vehicle body, the physical quantity relating to the lean angle of the vehicle body is not particularly limited. As long as the physical quantity relating to the vehicle speed is a physical quantity that poses information that contributes to the detection of the vehicle speed of the leaning vehicle, the physical quantity relating to the vehicle speed is not particularly limited. As long as the physical quantity relating to the lateral acceleration is a physical quantity that poses information that contributes to the detection of the lateral acceleration of the vehicle speed, the physical quantity relating to the lateral acceleration is not particularly limited.

The in-motion state detector may be a lateral acceleration detector. The lateral acceleration detector detects a physical quantity relating to the lateral acceleration of the vehicle body that is an acceleration of the vehicle body in the vehicle's left-right direction. As long as the physical quantity relating to the lateral acceleration is a physical quantity that poses information that contributes to the detection of the lateral acceleration of the vehicle body, which is an acceleration of the vehicle body in the vehicle's left-right direction, the physical quantity relating to the lateral acceleration is not particularly limited. The lateral acceleration detector may be, for example, a capacitance type, a piezoresistive type or a piezoelectric type. When the lateral acceleration detector is a piezoelectric type, the physical quantity relating to the lateral acceleration is a voltage generated by application of pressure on a piezoelectric member. The lateral acceleration detector may be implemented, for example, by an inertial measurement unit (IMU).

In the leaning vehicle with a steerable wheel including the lateral accelerator, the controller may control the torque outputted from the centripetal force generation actuator based on the lateral acceleration detected by the lateral acceleration detector while controlling the lean actuator in accordance with the turn operation inputted to the turn operation input device and thereby control the leaning condition of the vehicle body during the turn of the leaning vehicle and the centripetal force acting on the one or two steerable front wheels and the one or two rear wheels during the turn of the leaning vehicle.

In this case, the torque outputted from the centripetal force generation actuator is controlled based on the lateral acceleration, which relates to an inertial force generated during a turn of the leaning vehicle with a steerable front wheel, and therefore, the centripetal force acting on the one or two steerable front wheels and the one or two rear wheels during the turn of the leaning vehicle can be controlled more appropriately.

In the leaning vehicle with a steerable front wheel according to the embodiment of the present teaching, a contact area and a Zero Moment Point (ZMP) position may be defined. The contact area is an area that is delimited by a plurality of line segments that interconnect contact points where the one or two steerable front wheels and the one or two rear wheels respectively touch the road surface. When the leaning vehicle with a steerable front wheel is a three-wheeled vehicle, the contact area is triangular when viewed in an upward direction or a downward direction of the leaning vehicle with a steerable front wheel. When the leaning vehicle with a steerable front wheel is a four-wheeled vehicle, the contact area is quadrangular when viewed in the upward direction or the downward direction of the leaning vehicle with a steerable front wheel. The ZMP position is a position of an intersection point between an imaginary line and the road surface, the imaginary line being parallel to a direction of a resultant force of a gravity acting on the center of mass of the leaning vehicle with a steerable front wheel and an inertial force acting on the center of mass of the leaning vehicle with a steerable front wheel and passing the center of mass of the leaning vehicle with a steerable front wheel.

In the leaning vehicle with a steerable front wheel according to the embodiment of the present teaching, the controller may control the torque outputted from the centripetal force generation actuator while controlling the lean actuator in accordance with the turn operation inputted to the turn operation input device such that the ZMP position stays in the contact area, and thereby control the leaning condition of the vehicle body during the turn of the leaning vehicle and the centripetal force acting on the one or two steerable front wheels and the one or two rear wheels during the turn of the leaning vehicle.

In this case, the torque outputted from the centripetal force generation actuator is controlled in view of the relationship between the ZMP position and the contact area, and therefore, the centripetal force acting on the one or two steerable front wheels and the one or two rear wheels can be controlled more appropriately.

The leaning vehicle with a steerable front wheel according to the embodiment of the present teaching may further include a lateral acceleration detector or a front-back direction acceleration detector. The lateral acceleration detector detects a physical quantity relating to the lateral acceleration of the vehicle body that is an acceleration of the vehicle body in the vehicle's left-right direction. The front-back direction acceleration detector detects a physical quantity relating to the front-back direction acceleration of the vehicle body that is an acceleration of the vehicle body in the vehicle's front-back direction.

As long as the physical quantity relating to the lateral acceleration of the vehicle body contributes to detection of the lateral acceleration, which is an acceleration of the vehicle body in the vehicle's left-right direction, the physical quantity relating to the lateral acceleration is not particularly limited. The lateral acceleration detector may be, for example, a capacitance type, a piezoresistive type or a piezoelectric type. When the lateral acceleration detector is a piezoelectric type, the physical quantity relating to the lateral acceleration is a voltage generated by application of pressure on a piezoelectric member. The lateral acceleration detector may be implemented, for example, by an inertial measurement unit (IMU).

As long as the physical quantity relating to the lateral acceleration of the vehicle body contributes to detection of the front-back direction acceleration, which is an acceleration of the vehicle body in the vehicle's front-back direction, the physical quantity relating to the front-back direction acceleration is not particularly limited. The front-back direction acceleration detector may be, for example, a capacitance type, a piezoresistive type or a piezoelectric type. When the front-back direction acceleration detector is a piezoelectric type, the physical quantity relating to the front-back direction acceleration is a voltage generated by application of pressure on a piezoelectric member. The front-back direction acceleration detector may be implemented, for example, by an inertial measurement unit (IMU).

In the leaning vehicle with a steerable front wheel according to the embodiment of the present teaching, the controller may control the torque outputted from the centripetal force generation actuator based on the lateral acceleration detected by the lateral acceleration detector or the front-back direction acceleration detected by the front-back direction acceleration detector while controlling the lean actuator in accordance with the turn operation inputted to the turn operation input device such that the ZMP position stays in the contact area, and thereby control the leaning condition of the vehicle body during the turn of the leaning vehicle and the centripetal force acting on the one or two steerable front wheels and the one or two rear wheels during the turn of the leaning vehicle.

In this case, the torque outputted from the centripetal force generation actuator is controlled based on the lateral acceleration or the front-back direction acceleration, which relates to an inertial force acting on the center of mass of the leaning vehicle with a steerable front wheel (i.e., which has an effect on the ZMP position), and therefore, the centripetal force acting on the one or two steerable front wheels and the one or two rear wheels can be controlled more appropriately.

In the leaning vehicle with a steerable front wheel according to the embodiment of the present teaching, when the vehicle speed of the leaning vehicle is changed while the leaning vehicle is turning at a constant rate and the turn operation inputted to the turn operation input device remains unchanged, the controller may control the torque outputted from the centripetal force generation actuator while controlling the lean actuator in accordance with the turn operation in such a manner so as to change the centripetal force acting on the one or two front wheels and the one or two rear wheels without changing the lean angle of the vehicle body or in such a manner so as to change the lean angle of the vehicle body without changing the centripetal force acting on the one or two front wheels and the one or two rear wheels.

In the leaning vehicle with a steerable front wheel according to the embodiment of the present teaching, when the lean angle of the vehicle body during the turn of the leaning vehicle in accordance with the turn operation inputted to the turn operation input device is a predetermined limited lean angle, the controller may control the torque outputted from the centripetal force generation actuator while controlling the lean actuator in accordance with the turn operation inputted to the turn operation input device so as to increase the centripetal force acting on the one or two steerable front wheels and the one or two rear wheels without changing the lean angle of the vehicle body. The predetermined limited lean angle is, for example, a maximum possible lean angle while the leaning vehicle is traveling at a certain speed. The predetermined limited angle, for example, may be changed depending on the traveling speed of the leaning vehicle.

In the leaning vehicle with a steerable front wheel according to the embodiment of the present teaching, the lean actuator may be a rotating electric machine for leaning that rotates its output member in a first direction to lean the vehicle body in a vehicle's leftward direction when the turn operation inputted to the turn operation input device is an operation to turn the leaning vehicle in the vehicle's leftward direction and rotates its output member in a second direction to lean the vehicle body in a vehicle's rightward direction when the turn operation inputted to the turn operation input device is an operation to turn the leaning vehicle in the vehicle's rightward direction.

In the leaning vehicle with a steerable front wheel according to the embodiment of the present teaching, the centripetal force generation actuator is any one of the following: (a), (b), (c), a combination of (a) and (b), a combination of (a) and (c), a combination of (b) and (c), or a combination of (a), (b) and (c);

(a) a rotating electric machine for steering steerable wheel that is mechanically connected to the one or two steerable front wheels, rotates its output member in a third direction to apply torque to swivel the one or two steerable front wheels in a fifth direction and rotates its output member in a fourth direction to apply torque to swivel the one or two steerable front wheels in a sixth direction;

(b) a power unit that applies different amounts of torque to the respective wheels of the steerable front wheels or the rear wheels that are formed by a right wheel and a left wheel; and (c) a brake unit that applies different amounts of torque to the respective wheels of the steerable front wheels or the rear wheels that are formed by a right wheel and a left wheel.

Some embodiments of the present teaching will hereinafter be described in detail with reference to the drawings, and the detailed description of the embodiments will provide a clearer picture of the above-mentioned object and other objects, the features, the aspects and the advantages of the present teaching.

The term "and/or" used herein includes one of the associated items in a list and all possible combinations of the associated items.

The terms "including", "comprising", or "having", and variations thereof used herein specify the presence of stated features, steps, operations, elements, components, and/or equivalents thereof, and can include one or more of steps, operations, elements, components, and/or their groups.

Unless otherwise defined, all terms (including technical and scientific terms) used herein have the same meanings as commonly understood by one of ordinary skill in the art to which the present teaching pertains.

It should be understood that terms, such as those defined in commonly used dictionaries, should be interpreted as having meanings that are consistent with their meanings in the context of the present disclosure and relevant art and should not be interpreted in an idealized or overly formal sense unless expressly so defined herein.

It should be understood that the description of the present teaching discloses a number of techniques and steps. Each of these has individual benefit, and each can also be used in conjunction with one or more, or in some cases all, of the other disclosed techniques. Accordingly, for the sake of clarity, this description will refrain from repeating every possible combination of the individual steps in an unnecessary fashion. Nevertheless, Description and Claims should be read with the understanding that such combinations are entirely within the scope of the present teaching and the claims.

In the description given below, for the purpose of explanation, numerous specific details are set forth in order to provide a complete understanding of the present teaching. It will be apparent, however, that those skilled in the art may practice the present teaching without these specific details. The present disclosure is to be considered as an exemplification of the present teaching and is not intended to limit the present teaching to the specific embodiments illustrated by drawings or descriptions below.

Advantageous Effect of Invention

The present teaching relates to a leaning vehicle with a steerable front vehicle, including a turn operation input device that is configured to not transmit a turn operation inputted by the rider to one or two steerable front wheels mechanically, thereby preventing the one or two steerable front wheels from swiveling due to mechanical transmission of the turn operation, and the present teaching improves the leaning vehicle in the robustness to turning.

DESCRIPTION OF EMBODIMENTS

With reference to the drawings, a leaning vehicle with a steerable front wheel according to an embodiment of the present teaching will hereinafter be described. The embodiment described below is merely an example. The present teaching should not be interpreted as being limited to the embodiment below.

Figure 1:
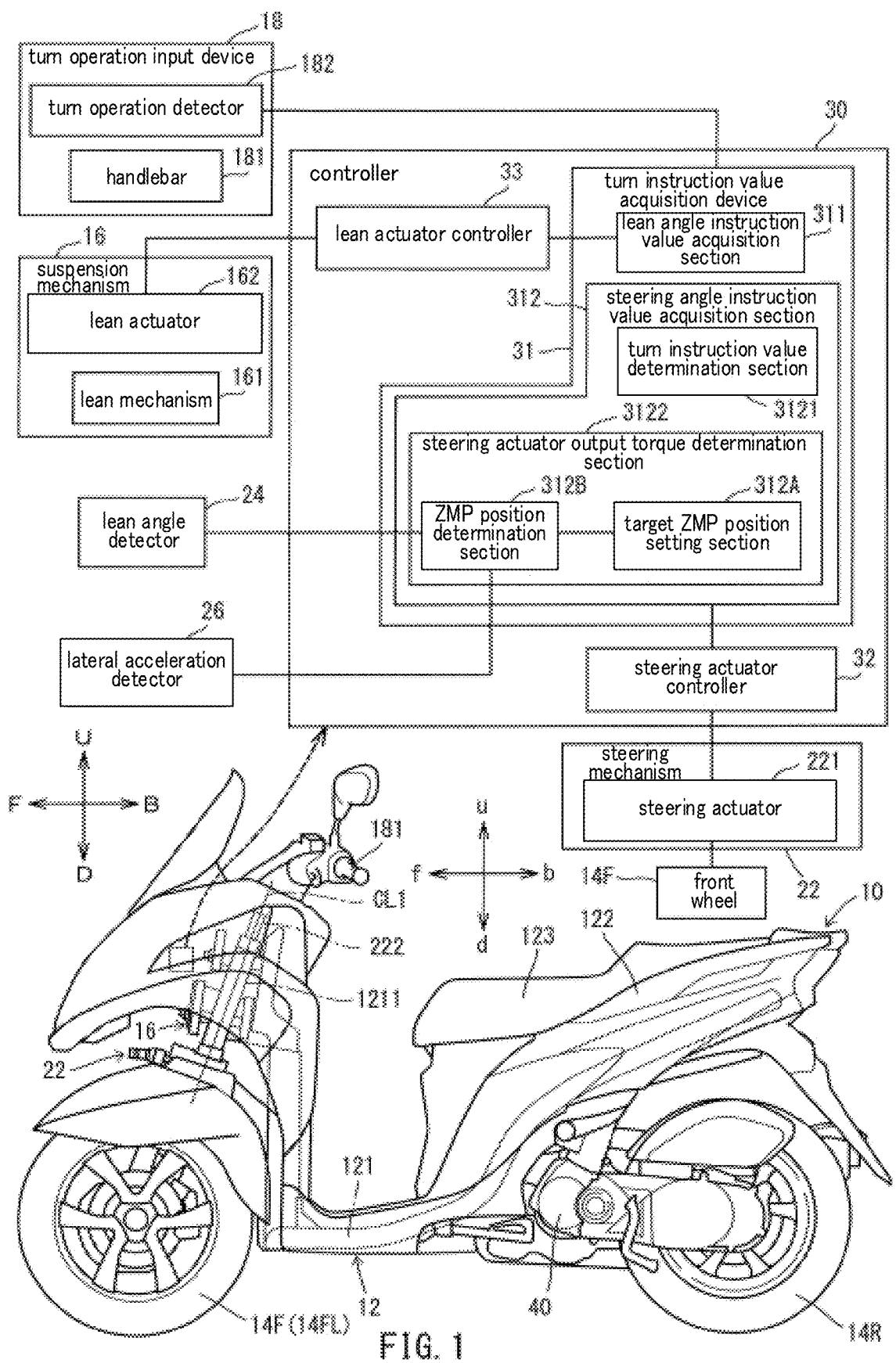
FIG. 1 is a diagram showing a left side view of a leaning vehicle with a steerable front wheel according to an embodiment of the present teaching along with a block diagram of a controller contained in the leaning vehicle.

With reference to FIG. 1, a leaning vehicle 10 with a steerable front wheel according to an embodiment of the present teaching will be described. FIG. 1 is a diagram showing a left side view of the leaning vehicle 10 and a block diagram of a controller 30 of the leaning vehicle 10.

In the present specification, directions relative to the leaning vehicle 10 are defined as follows.

A forward direction of the leaning vehicle 10 is defined as a vehicle's forward direction F. A backward direction of the leaning vehicle 10 is defined as a vehicle's backward direction B. A leftward direction of the leaning vehicle 10 is defined as a vehicle's leftward direction L. A rightward direction of the leaning vehicle 10 is defined as a vehicle's rightward direction R. An upward direction of the leaning vehicle 10 is defined as a vehicle's upward direction U. A downward direction of the leaning vehicle 10 is defined as a vehicle's downward direction D. The forward-backward direction of the leaning vehicle 10 is defined as a vehicle's front-back direction FB. The leftward-rightward direction of the leaning vehicle 10 is defined as a vehicle's left-right direction LR. The upward-downward direction of the leaning vehicle 10 is defined as a vehicle's up-down direction UD. The front-back, left-right and up-down directions are viewed as front-back, left-right, up-down from the perspective of a rider sitting on the seat 123 of the leaning vehicle 10.

The vehicle body 12 of the leaning vehicle 10 is capable of leaning in the vehicle's leftward direction L or the vehicle's rightward direction R. When the vehicle body 12 leans in the vehicle's leftward direction L or the vehicle's rightward direction R, the up-down direction and the left-right direction of the vehicle body 12 do not respectively coincide with the up-down direction UD and the left-right direction LR of the leaning vehicle 10. On the other hand, when the vehicle body 12 is in an upright posture, the up-down direction and the left-right direction of the vehicle body 12 coincide with the up-down direction UD and the left-right direction LR of the leaning vehicle 10, respectively.

A forward direction of the vehicle body 12 of the leaning vehicle 10 is defined as a vehicle-body's forward direction f. A backward direction of the vehicle body 12 is defined as a vehicle-body's backward direction b. A leftward direction of the vehicle body 12 is defined as a vehicle-body's leftward direction l. A rightward direction of the vehicle body 12 is defined as a vehicle-body's rightward direction r. An upward direction of the vehicle body 12 is defined as a vehicle-body's upward direction u. A downward direction of the vehicle body 12 is defined as a vehicle-body's downward direction d. The forward-backward direction of the vehicle body 12 is defined as a vehicle-body's front-back direction fb. The leftward-rightward direction of the vehicle body 12 is defined as a vehicle-body's left-right direction lr. The upward-downward direction of the vehicle body 12 is defined as a vehicle-body's up-down direction ud.

As shown in FIG. 1, the leaning vehicle 10 includes a vehicle body 12, a plurality of wheels 14, a suspension mechanism 16, a turn operation input device 18, a steering mechanism 22, a lean angle detector 24, a lateral acceleration detector 26, and a controller 30.

The vehicle body 12 leans in the vehicle's leftward direction L when the leaning vehicle 10 is turning in the vehicle's leftward direction L, and leans in the vehicle's rightward direction R when the leaning vehicle 10 is turning in the vehicle's rightward direction R. The plurality of wheels 14 are supported by the vehicle body 12.

The vehicle body 12 includes a vehicle body frame 121, a vehicle body cover 122, and a seat 123.

The vehicle body frame 121 includes a head pipe 1211. The head pipe 1211 is positioned in the front-end part of the vehicle body frame 121.

The leaning vehicle 10 further includes a power unit 40. The power unit 40 includes, for example, a drive source such as an engine, an electric motor or the like, a transmission, etc. The drive source may be a hybrid type, for example, having an engine and an electric motor. The power unit 40 is supported by the vehicle body frame 121.

The vehicle body cover 122 is attached to the vehicle body frame 121. The vehicle body cover 122 covers the vehicle body frame 121.

The seat 123 is supported by the vehicle body frame 121. The seat 123 is to be sat on by a rider.

The plurality of wheels 14 form a steerable front wheel set including two steerable front wheels 14F, and a rear wheel set including one rear wheel 14R. These wheels will be described below.

The two steerable front wheels 14F are arranged side by side in the vehicle's left-right direction LR. Thus, the two steerable front wheels 14F are a pair of left and right wheels that are arranged side by side in the vehicle's left-right direction LR. The two steerable front wheels 14F include a steerable left front wheel 14FL and a steerable right front wheel 14FR. The two steerable front wheels 14F are supported by the head pipe 1211 of the vehicle body 12 in such a manner so as to be able to swivel around an axis CL1 extending in the vehicle-body's up-down direction ud.

The one rear wheel 14R is supported by the vehicle body 12. Specifically, the one rear wheel 14R is supported by the vehicle body frame 121 via a swing arm suspension. The one rear wheel 14R, which is supported by the vehicle body frame 121, does not swivel around an axis extending in the vehicle-body's up-down direction ud.

Driving force from the power unit 40 is transmitted to the one rear wheel 14R. Thereby, the one rear wheel 14R rotates. As a result, the leaning vehicle 10 travels. Thus, the drive wheel of the leaning vehicle 10 is the one rear wheel 14R.

The suspension mechanism 16 supports the two steerable front wheels 14 (i.e., the left-right pair of wheels) such that the two steerable front wheels 14 are movable in the vehicle-body's up-down direction ud relative to the vehicle body 12. The suspension mechanism 16 is positioned between the head pipe 1211 of the vehicle body frame 121 and the two steerable front wheels 14F. In other words, the head pipe 1211 of the vehicle body frame 121 is connected to the two steerable front wheels 14F via the suspension mechanism 16. The suspension mechanism 16 will be described in detail later.

The turn operation input device 18 receives a turn operation by the rider. The turn operation input device 18 includes a handlebar 181 as a manipulable member that can be manipulated by the rider. The handlebar 181 is to be manipulated by the rider to turn the leaning vehicle 10. In this way, the handlebar 181 receives a turn operation by the rider.

The turn operation input device 18 is configured to not transmit the turn operation inputted by the rider to the two steerable front wheels 14F mechanically and thereby prevents the two steerable front wheels 14F from swiveling around the axis CL1 due to mechanical transmission of the turn operation inputted by the rider. Specifically, the handlebar 181 is not mechanically connected to the two steerable front wheels 14F. Accordingly, mechanical power is not transmitted from the handlebar 181 to the two steerable front wheels 14F.

The turn operation input device 18 further includes a turn operation detector 182. The turn operation detector 182 detects the direction and degree of a manipulation action applied to the handlebar 181. The turn operation detector 182 sends the detected direction and degree of the manipulation action applied to the handlebar 181 to the controller 30. As long as the turn operation detector 182 is one that can detect the direction and degree of a manipulation action applied to the handlebar 181, the turn operation detector 182 is not particularly limited. The turn operation detector 182, for example, detects the direction and degree of a manipulation action applied to the handlebar 181 in a non-contact manner. The turn operation detector 182 is implemented, for example, by an encoder or the like.

Figure 2:
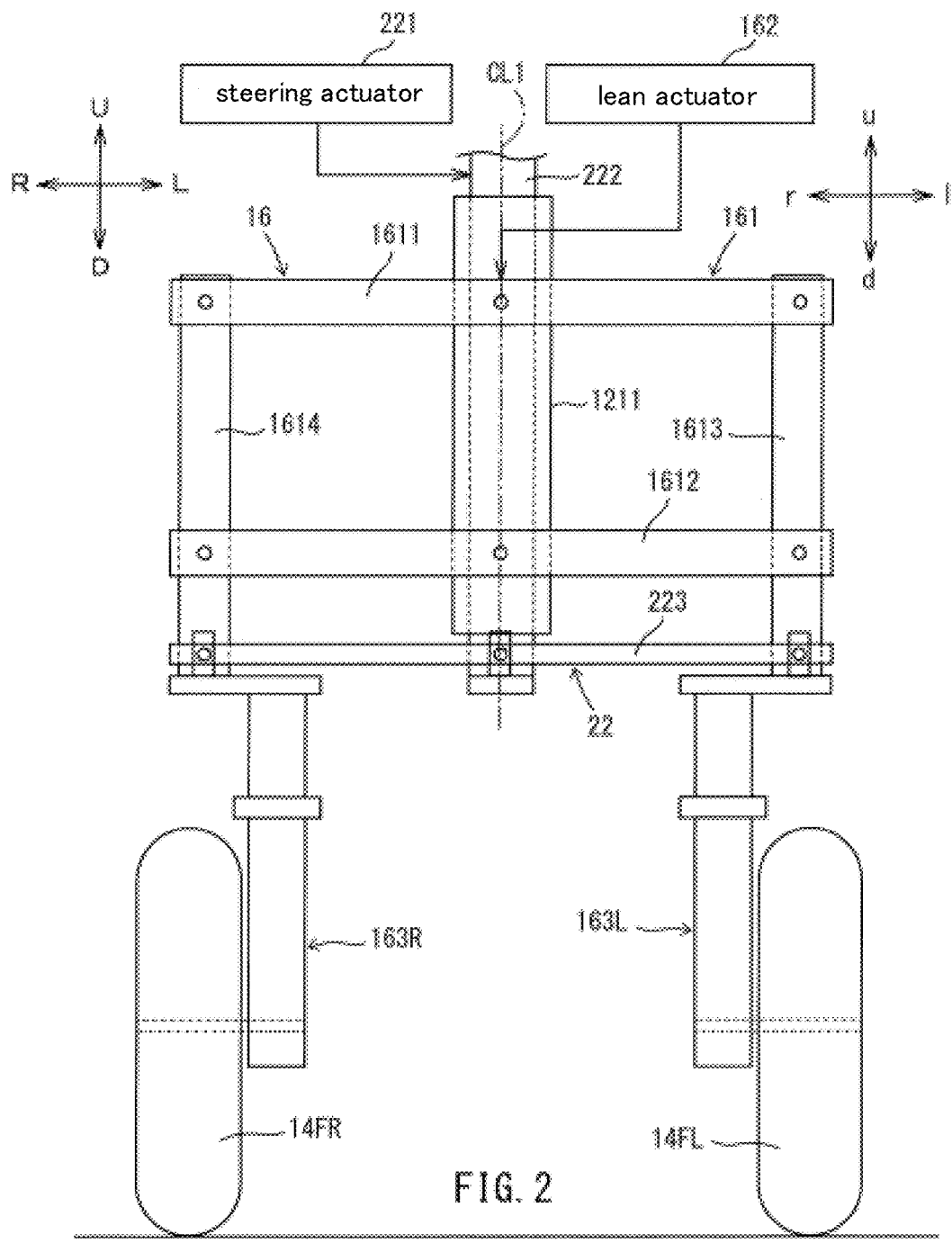
FIG. 2 is a diagram showing the basic structure of a suspension and a steering mechanism of the leaning vehicle with a steerable front wheel according to the embodiment.

With reference to FIG. 2, the suspension mechanism 16 will be described. FIG. 2 is a diagram showing the basic structure of the suspension mechanism 16 and the steering mechanism 22.

The suspension mechanism 16 functions as a leaning device. The suspension mechanism 16 includes a lean mechanism 161, a lean actuator 162, a left suspension 163L, and a right suspension 163R.

The lean mechanism 161 is a parallelogram link type lean mechanism. The lean mechanism 161 includes an upper arm 1611, a lower arm 1612, a left member 1613, and a right member 1614.

The upper arm 1611 and the lower arm 1612 are supported by the vehicle body frame 121 such that each of the upper and lower arms 1611 and 1612 is rotatable around a rotation axis extending in the vehicle-body's front-back direction fb. The upper arm 1611 and the lower arm 1612 are connected to the head pipe 1211 of the vehicle body frame 121 in such a manner so as to be separately rotatable around the head pipe 1211.

The left member 1613 is supported by the left end part of the upper arm 1611 and the left end part of the lower arm 1612 in such a manner so as to be rotatable around a rotation axis extending in the vehicle-body's front-back direction fb. Thus, the left member 1613 is rotatably connected to the left portion of the upper arm 1611 that is positioned to the left of the rotation axis (axis of rotation around the head pipe 1211) of the upper arm 1611 and to the left portion of the lower arm 1612 that is positioned to the left of the rotation axis (axis of rotation around the head pipe 1211) of the lower arm 1612. To the lower end part of the left member 1613, the left suspension 163L is connected via a bracket. The left suspension 163L is extendable and contractable in the vehicle-body's up-right direction ud. The steerable left front wheel 14FL is rotatably connected to the left suspension 163L.

The right member 1614 is supported by the right end part of the upper arm 1611 and the right end part of the lower arm 1612 in such a manner so as to be rotatable around a rotation axis extending in the vehicle-body's front-back direction fb. Thus, the right member 1614 is rotatably connected to the right portion of the upper arm 1611 that is positioned to the right of the rotation axis (axis of rotation around the head pipe 1211) of the upper arm 1611 and to the right portion of the lower arm 1612 that is positioned to the right of the rotation axis (axis of rotation around the head pipe 1211) of the lower arm 1612. To the lower end part of the right member 1614, the right suspension 163R is connected via a bracket. The right suspension 163R is extendable and contractable in the vehicle-body's up-right direction ud. The steerable right front wheel 14FR is rotatably connected to the right suspension 163R.

As described above, to the left portion of the upper arm 1611 and the left portion of the lower arm 1612, which are positioned to the left of their respective rotation axes, the steerable left front wheel 14FL is rotatably connected via the left member 1613 and the left suspension 163L. Also, to the right portion of the upper arm 1611 and the right portion of the lower arm 1612, which are positioned to the right of their respective rotation axes, the steerable right front wheel 14FR is rotatably connected via the right member 1614 and the right suspension 163R. Accordingly, when the upper arm 1611 and the lower arm 1612 rotate around their respective rotation axes, the relative positions of the steerable left front wheel 14FL and the steerable right front wheel 14FR to the vehicle body frame 121 in the vehicle-body's up-down direction ud change. When the relative positions of the steerable left front wheel 14FL and the steerable right front wheel 14FR to the vehicle body frame 121 in the vehicle-body's up-down direction ud change, the vehicle body frame 121 leans in the vehicle's right-left direction LR. Thus, by controlling the rotation of the upper arm 1611 and the lower arm 1612 relative to the vehicle body frame 121, it is possible to control the lean of the vehicle body frame 121 to the vehicle's leftward direction L or the vehicle's rightward direction R (lean angle).

The lean actuator 162 causes the upper arm 1611 or the lower arm 1622 to rotate relative to the vehicle body frame 121 (more specifically, the head pipe 1211) in accordance with the turn operation inputted to the turn operation input device 18. The lean actuator 162 is, for example, a rotating electric machine for leaning. The rotating electric machine for leaning is, for example, attached to the vehicle body frame 121. The rotating electric machine for leaning is, for example, an electric motor that can rotate an output member mechanically connected to the upper arm 1611 or the lower arm 1612 forward and in reverse. The output member is, for example, an output shaft connected to the rotor of the electric motor. For control of the lean actuator 162, for example, position control to control the position of the output member of the lean actuator 162 is carried out.

When the output of the lean actuator 162 is transmitted to the upper arm 1611 or the lower arm 1612, the upper arm 1611 or the lower arm 1612 rotates relative to the vehicle body frame 12 (more specifically, the head pipe 1211). Then, the relative positions of the steerable left front wheel 14FL and the steerable right front wheel 14FR to the vehicle body frame 121 in the vehicle-body's up-down direction ud change. As a result, the vehicle body frame 121 leans to the vehicle's leftward direction L or the vehicle's rightward direction R. Thus, the vehicle body 12 leans to the vehicle's leftward direction L or the vehicle's rightward direction R.

Specifically, when the turn operation inputted to the turn operation input device 18 is an operation to turn the leaning vehicle 10 to the vehicle's leftward direction L, the lean actuator 162 causes the upper arm 1611 and the lower arm 1612 to rotate in one direction (which is referred to as a first rotation direction) relative to the vehicle body frame 121 (more specifically the head pipe 1211). This changes the relative positions of the steerable left front wheel 14FL and the steerable right front wheel 14FR to the vehicle body frame 121 in the vehicle-body's up-down direction ud, and the steerable left front wheel 14FL comes to a position higher than the steerable right front wheel 14FR in the vehicle-body's up-down direction ud. Then, the vehicle body frame 121 and accordingly the vehicle body 12 lean to the vehicle's leftward direction L.

Also, when the turn operation inputted to the turn operation input device 18 is an operation to turn the leaning vehicle 10 to the vehicle's rightward direction R, the lean actuator 162 causes the upper arm 1611 and the lower arm 1612 to rotate in another direction (which is an opposite direction to the first direction and is referred as a second rotation direction) relative to the vehicle body frame 121 (more specifically, the head pipe 1211). This changes the relative positions of the steerable left front wheel 14FL and the steerable right front wheel 14FR to the vehicle body frame 121 in the vehicle-body's up-down direction ud, and the steerable right front wheel 14FR comes to a position higher than the steerable left front wheel 14FL in the vehicle-body's up-down direction ud. Then, the vehicle body frame 121 and accordingly the vehicle body 12 lean to the vehicle's rightward direction R.

As is clear from the description above, when the turn operation inputted to the turn operation input device 18 is an operation to turn the leaning vehicle 10 to the vehicle's leftward direction L, the lean actuator 162, which is a rotating electric machine for leaning, rotates its output member in one direction (which is referred to as a first direction) and thereby leans the vehicle body 12 in the vehicle's leftward direction L. When the turn operation inputted to the turn operation input device 18 is an operation to turn the leaning vehicle 10 to the vehicle's rightward direction R, the lean actuator 162, which is a rotating electric machine for leaning, rotates its output member in another direction (which is referred to as a second direction) and thereby leans the vehicle body 12 in the vehicle's rightward direction R.

As is clear from the description above, the lean actuator 162 leans the two steerable front wheels 14F in the vehicle's leftward direction L or the vehicle's rightward direction R together with the vehicle body 12. Also, since the one rear wheel 14R is supported by the vehicle body frame 121, when the lean actuator 162 leans the two steerable front wheels 14F and the vehicle body 12 in the vehicle's leftward direction L or the vehicle's rightward direction R, the one rear wheel 14R leans in the vehicle's leftward direction L or the vehicle's rightward direction R together with the two steerable front wheels 14F and the vehicle body 12. Thus, when the turn operation inputted to the turn operation input device 18 is an operation to turn the leaning vehicle 10 in the vehicle's leftward direction L, the lean actuator 162 leans the vehicle body 12, the two steerable front wheels 14F and the one rear wheel 14R in the vehicle's leftward direction L. When the turn operation inputted to the turn operation input device 18 is an operation to turn the leaning vehicle 10 in the vehicle's rightward direction R, the lean actuator 162 leans the vehicle body 12, the two steerable front wheels 14F and the one rear wheel 14R in the vehicle's rightward direction R.

With reference to FIG. 1, the steering mechanism 22 will be described. The steering mechanism 22 applies torque to the two steerable front wheels 14F to swivel them around the axis CL1. Thereby, the two steerable front wheels 14F swivel around the axis CL1. The application of torque to the two steerable front wheels 14F by the steering mechanism 22 is performed in accordance with the turn operation inputted to the turn operation input device 18.

With reference to FIG. 2, the steering mechanism 22 will be described. The steering mechanism 22 functions as a centripetal force generator. The steering mechanism 22 includes a steering actuator 221, a steering shaft 222, and a tie rod 223.

The steering actuator 221 functions as a centripetal force generation actuator. The steering actuator 221 causes the steering shaft 222 to rotate in accordance with the turn operation inputted to the turn operation input device 18. The steering actuator 221, for example, rotates an output member mechanically connected to the steering shaft 222. The steering actuator 221 is, for example, a rotating electric machine for steering steerable wheel. The rotating electric machine for steering steerable wheel is, for example, an electric motor that can rotate its output member, which is mechanically connected to the steering shaft 222, forward and in reverse. The output member is, for example, an output shaft connected to the rotor of the electric motor. For control of the steering actuator 221, for example, torque control to control the output torque of the steering actuator 221 is carried out.

The steering shaft 222 is inserted in the head pipe 1211 of the vehicle body frame 121. The steering shaft 222 is rotatable relative to the head pipe 1211. The steering shaft 222 is not mechanically connected to the handlebar 181. Accordingly, the rider's manipulation of the handlebar 181 is never transmitted to the steering shaft 222 mechanically.

The tie rod 223 transmits rotation of the steering shaft 222 to the two steerable front wheels 14F. The center part of the tie rod 223 is mechanically connected to the lower end part of the steering shaft 222. The left end part of the tie rod 223 is mechanically connected to the left suspension 163L. The right end part of the tie rod 223 is mechanically connected to the right suspension 163R.

When the steering shaft 222 rotates, the tie rod 223 moves in the direction in which the steering shaft 222 rotates, while maintaining its posture. In the meantime, the motion of the left end part of the tie rod 223 is transmitted to the steerable left front wheel 14FL via the left suspension 163L. This causes the steerable left front wheel 14FL to swivel around the axis CL1. In the same manner, the motion of the right end part of the tie rod 223 is transmitted to the steerable right front wheel 14FR via the right suspension 163R. This causes the steerable right front wheel 14FR to swivel around the axis CL1.

The steering mechanism 22 applies torque to the two steerable front wheels 14F to swivel them around the axis CL1 in accordance with the turn operation inputted to the turn operation input device 18 and thereby causes the two steerable front wheels 14F to swivel around the axis CL1.

Specifically, when the turn operation inputted to the turn operation input device 18 is an operation to turn the leaning vehicle 10 in the vehicle's leftward direction L, the steering shaft 222 is rotated in a third rotation direction by the steering actuator 221. In this regard, the tie rod 223 transmits the rotation of the steering shaft 222 to the two steerable front wheels 14F. As a result, the two steerable front wheels 14F swivel around the axis CL1 in one direction (which is referred to as a fifth direction). The rotation of the two steerable front wheels 14F in the fifth direction causes the leaning vehicle 10 to turn in the vehicle's leftward direction L.

Also, when the turn operation inputted to the turn operation input device 18 is an operation to turn the leaning vehicle 10 in the vehicle's rightward direction R, the steering shaft 222 is rotated in another direction (which is an opposite direction to the third rotation direction and is referred to as a fourth rotation direction) by the steering actuator 221. The fourth direction is opposite to the third rotation direction, and accordingly, when the third rotation direction is considered as the direction of forward rotation, the fourth rotation direction is the direction of reverse rotation. When the steering actuator 221 rotates the steering shaft 222 in the fourth rotation direction, the tie rod 223 transmits the rotation of the steering shaft 222 to the two steerable front wheels 14F. As a result, the two steerable front wheels 14F swivel around the axis CL1. Thereby, the two steerable front wheels 14F rotate in another direction (which is an opposite to the fifth direction and referred to as a sixth direction). The rotation of the two steerable front wheels 14F in the sixth direction causes the leaning vehicle 10 to turn in the vehicle's rightward direction R. The sixth rotation direction is opposite to the fifth rotation direction, and accordingly, when the fifth rotation direction is considered as the direction of forward rotation, the sixth rotation direction is the direction of reverse rotation.

As is clear from the description above, the steering actuator 221, which is a rotating electric machine for steering steerable wheel, is mechanically connected to the two steerable front wheels 14F such that its drive force is transmitted to the two steerable front wheels 14F. The steering actuator 221, which is a rotating electric machine for steering steerable wheel, rotates its output member in a third direction to apply torque to turn the two steerable front wheels 14F in the fifth rotation direction. The steering actuator 221, which is a rotating electric machine for steering steerable wheel, rotates its output member in a fourth direction to apply torque to turn the two steerable front wheels 14F in the sixth rotation direction.

With reference to FIG. 1, the lean angle detector 24, which functions as an in-motion state detector, detects the lean angle of the vehicle body 12. The lean angle of the vehicle body 12 means an angle by which the vehicle body 12 leans from the upright posture in the vehicle's left-right direction LR. The lean angle detector 24 sends the detected lean angle of the vehicle body 12 to the controller 30. The lean angle detector 24 may be implemented, for example, by an encoder or the like, or an inertial measurement unit (IMU).

The lateral acceleration detector 26, which also functions as an in-motion state detector, detects a physical quantity in association with lateral acceleration. The lateral acceleration is an acceleration of the vehicle body 12 in the vehicle's left-right direction LR. The lateral acceleration detector 26 sends the detected lateral acceleration to the controller 30. The lateral acceleration detector 26 may be implemented by, for example, a common acceleration sensor or an inertial measurement unit (IMU).

The controller 30 controls the lean actuator 162 and the steering actuator 221. In the present embodiment, the controller 30 controls the lean actuator 162 in accordance with the turn operation inputted to the turn operation input device 18, and at the same time, controls the torque outputted from the steering actuator 221 based on the turn operation inputted to the turn operation input device 18 and the in-motion state of the leaning vehicle 10 detected by the in-motion state detector. Specifically, the controller 30 controls the position of the output member of the lean actuator 162 in accordance with the turn operation inputted to the turn operation input device 18, and at the same time, the controller 30 controls the torque outputted from the steering actuator 221 based on the turn operation inputted to the turn operation input device 18, the lean angle of the vehicle body 12 detected by the lean angle detector 24 and the lateral acceleration detected by the lateral acceleration detector 26. More specifically, the controller 30 controls the position of the output member of the lean actuator 162 based on the turn operation inputted to the turn operation input device 18 such that a ZMP position P1, which will be described later, stays in a predetermined area, and at the same time, the controller 30 controls the torque outputted from the steering actuator 221 based on the turn operation inputted to the turn operation input device 18, the lean angle of the vehicle body 12 detected by the lean angle detector 24 and the lateral acceleration detected by the lateral acceleration detector 26. In this way, the controller 30 controls the leaning condition of the vehicle body 12 during a turn of the leaning vehicle 10 and the centripetal force acting on the two steerable front wheels 14F and the one rear wheel 14R during the turn of the leaning vehicle 10.

The controller 30 is, for example, an ECU (electric control unit). The ECU is implemented by, for example, a combination of an IC (integrated circuit), an electronic component, a circuit board, etc.

The controller 30 includes a turn instruction value acquisition device 31, a steering actuator controller 32, and a lean actuator controller 33. The turn instruction value acquisition device 31, the steering actuator controller 32, and the lean actuator controller 33 are implemented, for example, when a CPU (central processing unit) reads a program stored in non-volatile memory and carries out specified processing within the program.

The turn instruction value acquisition device 31 acquires a turn instruction value based on the direction and degree of the manipulation action applied to the handlebar 181 sent from the turn operation detector 182 of the turn operation input device 18. The turn instruction value indicates the details of the turn operation inputted by the rider. The turn instruction value is used to control the lean actuator 162 and the steering actuator 221 for a turn of the leaning vehicle 10. The turn instruction value may include different kinds of instruction values. The turn instruction value includes a lean instruction value that indicates a leaning condition of the vehicle body 12 during a turn of the leaning vehicle 10, and a steering instruction value that indicates a rotation direction and a rotation value for a turn of the leaning vehicle 10. The turn instruction value acquisition device 31 includes a lean instruction value acquisition section 311 and a steering instruction value acquisition section 312.

The lean instruction value acquisition section 311 acquires a lean instruction value that instructs a leaning condition of the vehicle body 12 during a turn of the leaning vehicle 10, based on the direction and degree of the manipulation action applied to the handlebar 181. The lean instruction value is an instruction value to control the lean actuator 162 for a turn of the leaning vehicle 10. The lean instruction value indicates, for example, a lean angle of the vehicle body 12 during a turn of the leaning vehicle 10. The lean instruction value acquisition section 311 may acquire the lean instruction value, for example, by selecting and acquiring a lean instruction value from a reference table stored in memory (not shown), depending on the direction and degree of the manipulation action applied to the handlebar 181. Table 1 shows an example of the reference table to be used for the acquisition of a lean instruction value. The reference table used for the acquisition of a lean instruction value may be changed, for example, depending on the vehicle speed of the leaning vehicle 10.

Alternatively, the reference table used for the acquisition of a lean instruction value may be changed, for example, depending on the relationship between a turn instruction value acquired by the turn instruction value acquisition device 31 and a predetermined reference instruction value. The lean instruction value acquisition section 311 may acquire the lean instruction value, for example, by calculation.

TABLE 1

| Turn Instruction Value | ... | −A1 | ... | 0 | ... | +A1 | ... |
|---|---|---|---|---|---|---|---|
| Lean Angle of Vehicle Body | ... | −θ1 | ... | 0 | ... | +θ1 | ... |

The steering instruction value acquisition section 312 acquires a steering instruction value that indicates a rotation direction and a rotation value for a turn of the leaning vehicle 10, based on the direction and degree of the manipulation action applied to the handlebar 181. The steering instruction value is an instruction value to control the steering actuator 221 to initiate and complete a turn of the leaning vehicle 10. The steering instruction value includes, for example, a torque instruction value that indicates output torque to be outputted from the steering actuator 221. The steering instruction value acquisition section 312 may acquire the steering instruction value, for example, by selecting and acquiring a steering instruction value from a reference table stored in memory (not shown), depending on the direction and degree of the manipulation action applied to the handlebar 181. The reference table used for the acquisition of a steering instruction value may be changed, for example, depending on the vehicle speed of the leaning vehicle 10. Alternatively, the reference table used for the acquisition of a steering instruction value may be changed, for example, depending on the relationship between a turn instruction value acquired by the turn instruction value acquisition device 31 and a predetermined reference instruction value. The steering instruction value acquisition section 312 may acquire the steering instruction value, for example, by calculation.

The steering instruction value acquisition section 312 includes a turn instruction value determination section 3121 and a steering actuator output torque determination section 3122. These will be described below.

The turn instruction value determination section 3121 determines whether the turn instruction value acquired by the turn instruction value acquisition device 31 is equal to or greater than a predetermined reference instruction value. The predetermined reference instruction value is a reference that is used to determine whether or not the steering actuator 221 is required to generate an additional centripetal force acting on the two steerable front wheels 14F and the one rear wheel 14R. For example, the reference instruction value is stored in memory (not shown).

When the turn instruction value acquired by the turn instruction value acquisition device 31 is equal to or greater than the predetermined reference instruction value, the lean angle of the vehicle body 12 is limited to a certain lean angle. This lean angle is referred to as a lean angle limit. The lean angle limit is, for example, the maximum possible lean angle when the leaning vehicle is traveling at a certain speed. The lean angle limit may be changed, for example, depending on the vehicle speed of the leaning vehicle.

The steering actuator output torque determination section 3122 includes a target ZMP position setting section 312A and a ZMP position determination section 312B. These will be described below.

The target ZMP position setting section 312A sets a target ZMP position based on the relationship between the turn instruction value acquired by the turn instruction value acquisition device 31 and the predetermined reference instruction value. The target ZMP position setting section 312A may set a ZMP position acquired by use of a reference table as the target ZMP position. Table 2 shows an example of the reference table. For example, the target ZMP position setting section 312A may use different reference tables, depending on the relationship between the turn instruction value acquired by the turn instruction value acquisition device 31 and the predetermined reference instruction value. The target ZMP position setting section 312A, for example, may set a ZMP position obtained by calculation as the target ZMP position. The target ZMP position setting section 312A, for example, may set the target ZMP position as a specified reference position, depending on the relationship between the turn instruction value acquired by the turn instruction value acquisition device 31 and the predetermined reference instruction value.

TABLE 2

| Turn Instruction Value | ... | −A1 | ... | 0 | ... | +A1 | ... |
|---|---|---|---|---|---|---|---|
| Target ZMP Position | ... | −X1 | ... | 0 | ... | +X1 | ... |

Figure 3:
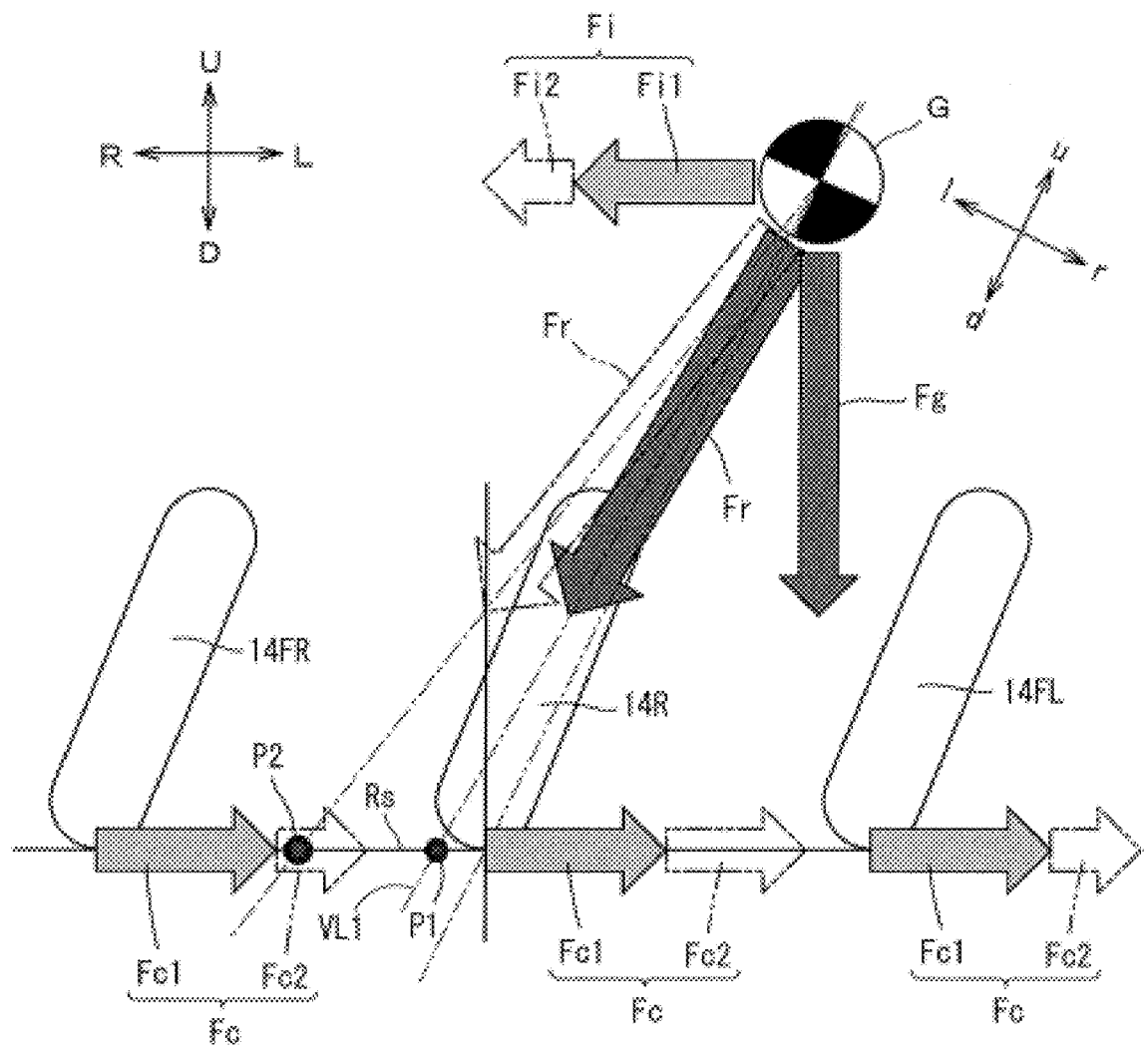
FIG. 3 is an illustration diagram showing the concept of a ZMP position and a target ZMP position.

With reference to FIG. 3, the ZMP position P1 and the target ZMP position P2 will be described. FIG. 3 is a conceptual diagram of the ZMP position P1 and the target ZMP position P2.

The ZMP position P1 is the position of an intersection point between an imaginary line VL1 and a road surface Rs. The imaginary line VL1 is a straight line that is parallel to the direction of a resultant force of the gravity Fg acting on the center of mass G of the leaning vehicle 10 and the inertial force Fi acting on the center of mass G of the leaning vehicle 10 and passes through the center of mass G of the leaning vehicle 10.

When the turn operation inputted by the rider does not require the generation of an additional centripetal force Fc2, the ZMP position P1 is on a predetermined reference point P0. Thus, when the turn operation inputted by the rider does not require the generation of an additional centripetal force Fc2, the ZMP position P1 does not shift even with a change in the lean angle of the vehicle body 12. In other words, when the turn operation inputted by the rider does not require the generation of an additional centripetal force Fc2, the ZMP position P1 does not shift based on the strength and direction of the inertial force Fi. The predetermined reference point P0 is, for example, the intersection point between the imaginary line VL1 and the road surface Rs when the leaning vehicle 10 is upright.

The additional centripetal force Fc2 is generated by the steering actuator 221. In the present embodiment, while the leaning vehicle 10 is turning, when the steering actuator 221 increases the steering angle of the two steerable front wheels 14F further, the additional centripetal force Fc2 is generated. The strength of the additional centripetal force Fc2 is controlled by the steering actuator 221 changing the steering angle of the two steerable front wheels 14F while the leaning vehicle 10 is turning.

The additional centripetal force Fc2 is a centripetal force acting in the same direction as a centripetal force Fc1 that is generated by a turn of the leaning vehicle 10 and acts on the two steerable front wheels 14F and the one rear wheel 14R. Thus, the additional centripetal force Fc2 is a force that increases the centripetal force Fc acting on the two steerable front wheels 14F and the one rear wheel 14R during a turn of the leaning vehicle 10.

The centripetal force Fc1, which is generated by a turn of the leaning vehicle 10 and acts on the two steerable front wheels 14F and the one rear wheel 14R, contributes to generation of an inertial force Fi1, which will be described later. The strength and direction of the centripetal force Fc1, which is generated by a turn of the leaning vehicle 10 and acts on the two steerable front wheels 14F and the one rear wheel 14R, depend on the lean angle of the vehicle body 12.

The additional centripetal force Fc2 contributes to generation of an additional inertial force Fi2. The additional inertial force Fi2 is an inertial force acting in the same direction as the inertial force Fi1 that is generated by a turn of the leaning vehicle 10. Thus, the additional inertial force Fi2 is a force that increases the inertial force Fi acting on the center of mass G of the turning leaning vehicle 10. The inertial force Fi1 that is generated by a turn of the leaning vehicle 10 is determined by the relationship between the force of gravity Fg acting on the center of mass G of the turning leaning vehicle 10 and the lean angle of the vehicle body 12.

When the turn operation inputted by the rider necessitates generation of an additional centripetal force Fc2, the ZMP position P1 is different from the predetermined reference point P0. Thus, when the turn operation inputted by the rider necessitates generation of an additional centripetal force Fc2, the ZMP position P1 is shifted in accordance with the strength and direction of the inertial force Fi. In other words, when the turn operation inputted by the rider necessitates generation of an additional centripetal force Fc2, the ZMP position P1 is shifted in accordance with the strength and direction of a lateral acceleration associated with the inertial force Fi. Thus, when the turn operation inputted by the rider necessitates generation of an additional centripetal force Fc2, the ZMP position P1 is shifted in accordance with the details of the turn operation inputted by the rider.

The target ZMP position P2 is the destination where the ZMP position P1 is shifted to in accordance with the turn operation inputted by the rider. The target ZMP position P2 is set in accordance with the details of the turn operation inputted by the rider.

In order to shift the ZMP position P1 to the target ZMP position P2, it is necessary to change the inertial force Fi. There are some cases in which the ZMP position P1 is required to be shifted to the target ZMP position P2, such as, for example, (A), (B) and (C) below:
 (A) when an additional centripetal force Fc2 is required to be generated in accordance with the turn operation inputted by the rider;
 (B) when the additional centripetal force Fc2 already generated due to the turn operation inputted by the rider is required to be increased; and (C) when the additional centripetal force Fc2 already generated due to the turn operation inputted by the rider is required to be decreased.

In a case of (A) or (B), the ZMP position P1 is shifted away from the predetermined reference point P0. Thus, in order to newly generate an additional centripetal force Fc2 or to increase the already generated centripetal force Fc2, the ZMP position P1 is moved in a direction away from the predetermined reference point P0.

In the case of (C), the ZMP position P1 is moved closer to the predetermined reference point P0. Thus, in order to decrease the already generated centripetal force Fc2, the ZMP position P1 is moved in a direction closer to the predetermined reference point P0.

As an example of shifting the ZMP position P1 to the target ZMP position P2, a case of (A), as shown in FIG. 3, will be described. In this case, in order to shift the ZMP position P1 to the target ZMP position P2, it is necessary to increase the inertial force Fi. Specifically, in addition to the inertial force Fi1 already generated from the turn of the leaning vehicle 10, an additional inertial force Fi2 that acts in the same direction as the inertial force Fi1 is required to be added.

In order to increase the inertial force Fi, it is necessary to increase the centripetal force Fc that is acting on the two steerable front wheels 14F and the one rear wheel 14R during the turn of the leaning vehicle 10. Specifically, in addition to the centripetal force Fc1 already generated from the turn of the leaning vehicle 10, an additional centripetal force Fc2 that acts in the same direction as the centripetal force Fc1 is required to be added.

In order to generate such an additional centripetal force Fc2, the steering actuator 221 is controlled. Specifically, the steering actuator 221 is controlled in such a manner that the steering angle of the two steerable front wheels 14F will become even larger.

The target ZMP position setting section 312A sets the target ZMP position P2 such that the ZMP position P1 stays within a specified area even when the ZMP position P1 shifts according to the turn operation inputted by the rider. In the present embodiment, the ZMP position P1 and the target ZMP position P2 can be defined, for example, by coordinates on a straight line extending in the vehicle's right-left direction LR.

When the ZMP position P1 and the target ZMP position P2 can be defined, by coordinates on a line extending in the vehicle's left-right direction LR, the target ZMP position P2 is set within a specified range on the line extending in the vehicle's left-right direction LR. The line that extends in the vehicle's left-right direction LR and that the ZMP position P2 is set on, for example, passes the center of mass G of the leaning vehicle 10 when viewed in the vehicle's upward direction U or the vehicle's downward direction D. The left end of the line that extends in the vehicle's left-right direction LR and that the ZMP position P2 is set on, for example, lies on a line passing the contact point of the left front wheel 14FL with the road surface Rs and the contact point of the rear wheel 14R with the road surface Rs when viewed in the vehicle's upward direction U or the vehicle's downward direction D. The right end of the line that extends in the vehicle's left-right direction LR and that the ZMP position P2 is set on, for example, lies on a line passing the contact point of the right front wheel 14FR with the road surface Rs and the contact point of the rear wheel 14R with the road surface Rs when viewed in the vehicle's upward direction U or the vehicle's downward direction D.

With reference to FIG. 1, the ZMP position determination section 312B determines the current ZMP position based on the lean angle of the vehicle body 12 sent from the lean angle detector 24 and the lateral acceleration sent from the lateral acceleration detector 26. The current ZMP position may be determined, for example, by calculation using the lean angle of the vehicle body 12 sent from the lean angle detector 24 and the lateral acceleration sent from the lateral acceleration detector 26. Alternatively, the current ZMP position may be determined, for example, by selecting and acquiring a ZMP position corresponding to the combination of the lean angle of the vehicle body 12 sent from the lean angle detector 24 and the lateral acceleration sent from the lateral acceleration detector 26 from a reference table stored in memory (not shown).

The steering actuator output torque determination section 3122 determines the torque to be outputted from the steering actuator 221 based on the difference between the target ZMP position set by the target ZMP position setting section 312A and the current ZMP position determined by the ZMP position determination section 312B. In the example shown in FIG. 3, the steering actuator output torque determination section 3122 determines an amount of torque that is required to generate a centripetal force Fc2 corresponding to the difference between the target ZMP position P2 set by the target ZMP position setting section 312A and the current ZMP position P1 determined by the ZMP position determination section 312B (ZMP position P1 on the predetermined reference point P0) as the output torque of the steering actuator 221. The steering actuator output torque determination section 3122 may determine the output torque of the steering actuator 221, for example, by calculation using the target ZMP position set by the target ZMP position setting section 312A and the current ZMP position determined by the ZMP position determination section 312B.

Alternatively, the steering actuator output torque determination section 3122 may determine the output torque of the steering actuator 221, for example, by selecting and acquiring torque corresponding to the difference between the target ZMP position set by the target ZMP position setting section 312A and the current ZMP position determined by the ZMP position determination section 312B from a reference table stored in memory (not shown).

With reference to FIG. 1, the steering actuator controller 32 controls the steering actuator 221 based on the output torque of the steering actuator 221 determined by the steering actuator output torque determination section 3122. In the example shown in FIG. 3, an amount of torque that is required to generate a centripetal force Fc2 corresponding to the difference between the target ZMP position P2 set by the target ZMP position setting section 312A and the current ZMP position P1 determined by the ZMP position determination section 312B (ZMP position P1 on the predetermined reference point P0) is determined as the output torque of the steering actuator 221, and then, the steering actuator controller 32 controls the steering actuator 221 based on the output torque.

With reference to FIG. 1, the lean actuator controller 33 controls the lean actuator 162 based on the lean instruction value acquired by the lean instruction value acquisition section 311.

Figure 4:
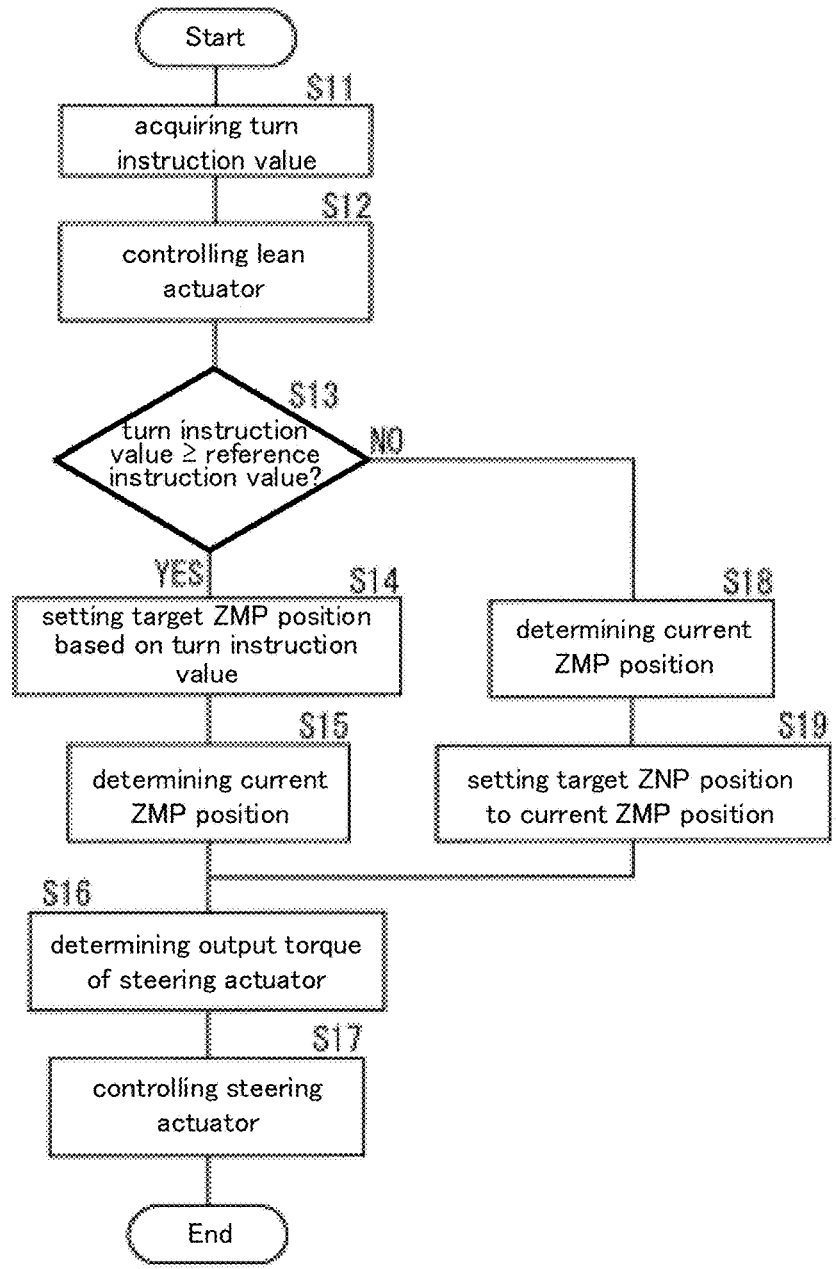
FIG. 4 is a flowchart showing a ZMP position control procedure to be carried out by the controller contained in the leaning vehicle with a steerable front wheel according to the embodiment.

Next, with reference to FIG. 4, the ZMP position control procedure carried out by the controller 30 will be described. FIG. 4 is a flowchart showing the ZMP position control procedure carried out by the controller 30. For example, the ZMP position control procedure is carried out at predetermined intervals while the leaning vehicle 10 is traveling.

First, at step S11, the controller 30 acquires a turn instruction value in accordance with the turn operation inputted by the rider. Specifically, the turn instruction value acquisition device 31 acquires a turn instruction value based on the direction and degree of the manipulation action applied to the handlebar 181 detected by the turn operation detector 182.

Next, at step S12, the controller 30 acquires a lean instruction value based on the turn instruction value obtained at step S11, and controls the lean actuator 162 in accordance with the acquired lean instruction value. Specifically, the lean actuator controller 33 obtains a lean instruction value from the turn instruction value acquired at step S11, and controls the lean actuator 162 in accordance with the obtained lean instruction value. Accordingly, the vehicle body 12, the two steerable front wheels 14F and the one rear wheel 14R lean to the same direction and at the same lean angle, in accordance with the direction and degree of the manipulation action applied to the handlebar 181. When the turn instruction value acquired by the turn instruction value acquisition device 31 is equal to or greater than a predetermined reference instruction value, a lean instruction value that limits the lean angle of the vehicle body 12 to a predetermined angle is acquired.

Next, at step S13, the controller 30 determines whether the turn instruction value acquired at step S11 is equal to or greater than the predetermined reference instruction value. Specifically, the turn instruction value determination section 3121 determines whether the turn instruction value acquired at step S11 is equal to or greater than the predetermined reference instruction value.

When the turn instruction value is equal to or greater than the predetermined reference instruction value (YES at step S13), at step S14, the controller 30 sets a target ZMP position based on the turn instruction value acquired at step S11. Specifically, the target ZMP position setting section 312A sets a target ZMP position based on the turn instruction value acquired at step S11.

Next, at step S15, the controller 30 determines the current ZMP position based on the lean angle of the vehicle body 12 sent from the lean angle detector 24 and the lateral acceleration sent from the lateral acceleration detector 26. Specifically, the ZMP position determination section 312B determines the current ZMP position based on the lean angle of the vehicle body 12 sent from the lean angle detector 24 and the lateral acceleration sent from the lateral acceleration detector 26.

Next, at step S16, the controller 30 determines the output torque of the steering actuator 221 based on the difference between the target ZMP position set at step S14 or step S19, which will be described later, and the current ZMP position determined at step S15. Specifically, the steering actuator output torque determination 3122 determines the output torque of the steering actuator 221 based on the difference between the target ZMP position set at step S14 or step S19, which will be described later, and the current ZMP position determined at step S15.

Next, at step S17, the controller 30 controls the steering actuator 221 based on the output torque of the steering actuator 221 determined at step S16. Specifically, the steering actuator controller 32 controls the steering actuator 221 based on the output torque of the steering actuator 221 determined at step S16. Then, the controller 30 completes the ZMP position control.

Now, the processing at steps S16 and S17 is described in more detail with reference to FIG. 3.

In the example of FIG. 3, the ZMP position P1 is considered as the current ZMP position. Based on the difference between the target ZMP position P2 and the ZMP position P1 (current ZMP position), the output torque of the steering actuator 221 is determined. In the example of FIG. 3, an amount of torque that is required to generate an additional centripetal force Fc2 is determined as the output torque. The output torque of the steering actuator 221 required to generate the additional centripetal force Fc2 is an amount of torque that is also required to increase the steering angle of the two steerable front wheels 14F further during the turn of the leaning vehicle 10. The steering actuator 221 is controlled based on such an output torque.

The output torque of the steering actuator 221 required to generate the additional centripetal force Fc2 is determined, for example, when the lean angle of the vehicle body 12 during the turn in accordance with the turn operation inputted to the turn operation input device 18 is the predetermined lean angle limit. In the present embodiment, the output torque of the steering actuator 221 required to generate the additional centripetal force Fc2 is determined, for example, when the turn instruction value acquired by the turn instruction value acquisition device 31 is equal to or greater than the predetermined reference instruction value.

When the lean angle of the vehicle body 12 during the turn in accordance with the turn operation inputted to the turn operation input device 18 is the predetermined lean angle limit, that is, when the turn instruction value acquired by the turn instruction value acquisition device 31 is equal to or greater than the predetermined reference instruction value, the controller 30 controls the steering actuator 221 to generate an additional centripetal force Fc2. In the time frame, the controller 30 does not change the lean angle of the vehicle body 12. Thus, the controller 30 controls the output torque of the steering actuator 221, which functions as a centripetal force generation actuator, while controlling the leaning vehicle 10 in accordance with the turn operation inputted to the turn operation input device 18, and thereby, the controller 30 controls the leaning vehicle 10 such that the centripetal force acting on the two steerable front wheels 14F and the one rear wheel 14R increases without the lean angle of the vehicle body 12 changed.

As shown in FIG. 4, when the turn instruction value is smaller than the predetermined reference instruction value (NO at step S13), the controller 30 determines the current ZMP position at step S18. Specifically, the predetermined reference position P0 is determined as the current ZMP position. Next, at step S19, the controller 30 sets the target ZMP position to the current ZMP position. Specifically, the target ZMP position setting section 312A sets the target ZMP position to the predetermined reference point P0, which is the current ZMP position. Thereafter, the controller 30 carries out the processing on and after step S16.

The above-described leaning vehicle 10 shows enhanced robustness throughout a complete turn. The reasons will be described below.

The turn operation input device 18 of the leaning vehicle 10 is configured to not transmit the turn operation inputted by the rider mechanically and thereby to prevent the two steerable front wheels 14F from swiveling due to mechanical transmission of the turn operation inputted by the rider. Therefore, it is preferred that the leaning vehicle 10 has enhanced robustness throughout a complete turn.

The leaning vehicle 10 has a steering mechanism 22 that functions as a centripetal force generator. The steering mechanism 22 that functions as a centripetal force generator includes a steering actuator 221 that functions as a centripetal force generation actuator. The steering actuator 221 that functions as a centripetal force generation actuator outputs torque that is controllable to generate an additional centripetal force Fc2 (see FIG. 3) that acts on the two steerable front wheels 14F and the one rear wheel 14R that are leaning during a turn of the leaning vehicle.

The controller 30 of the leaning vehicle 10 controls the steering actuator 221 while controlling the lean actuator 162 in accordance with the turn operation inputted to the turn operation input device 18, and in this way, the controller 30 controls the leaning condition of the turning vehicle body 12 and the centripetal force acting on the two steerable front wheels 14F and the one rear wheel 14R during the turn.

Thus, it is possible to control the turn of the leaning vehicle 10 both by controlling the leaning condition of the turning vehicle body 12 by use of the lean actuator that leans the vehicle body 12 in accordance with the turn operation and by controlling the steering actuator 221 that functions as a centripetal force generation actuator that generates an additional centripetal force Fc2 (see FIG. 3) acting on the two leaning steerable front wheels 14F and the one rear wheel 14R during the turn. Therefore, the leaning vehicle 10, which has a turn operation input device 18 that is configured to not transmit the turn operation inputted by the rider mechanically and thereby prevents the two steerable front wheels 14F from swiveling due to mechanical transmission of the turn operation inputted by the rider, has enhanced robustness throughout a complete turn.

The controller 30 of the leaning vehicle 10 controls the torque outputted from the steering actuator 221 while controlling the lean actuator 162 in accordance with the turn operation inputted to the turn operation input device 18. Therefore, it is possible to control the torque outputted from the steering actuator 221, for example, while controlling the lean actuator 162 such that the lean angle of the vehicle body 12 is maintained at a level corresponding to the turn operation inputted to the turn operation input device 18.

Further, the control of the centripetal force acting on the two steerable front wheels 14F and the one rear wheel 14R that are leaned by the control of the lean actuator 162 in accordance with the turn operation is carried out by controlling the torque outputted from the steering actuator 221, which functions as a centripetal force generation actuator. Therefore, the centripetal force can be controlled easily while the leaning condition of the vehicle body 12 is controlled by the lean actuator 162 in accordance with the turn operation. Specifically, as compared with the case of controlling the position of the output member of the steering actuator 221, it is no longer necessary to check the position of the output member of the steering actuator, and accordingly, the control of the steering actuator 221 becomes easier. Therefore, the leaning vehicle 10, which has a turn operation input device 18 that is configured to not transmit the turn operation inputted by the rider mechanically and thereby prevents the two steerable front wheels 14F from swiveling due to mechanical transmission of the turn operation inputted by the rider, has an enhanced robustness throughout a complete turn.

The controller 30 of the leaning vehicle 10 controls the torque outputted from the steering actuator 221, which functions as a centripetal force generation actuator, in accordance with the turn operation inputted to the turn operation input device 18 while controlling the lean actuator 162 in accordance with the turn operation inputted to the turn operation input device 18, and thereby, the controller 30 controls the leaning condition of the turning vehicle body 12 and the centripetal force acting on the two steerable front wheels 14F and the one rear wheel 14R during the turn.

The way in which the turn of the leaning vehicle 10 is operated by the rider is also used in the determination of the control of the torque outputted from the steering actuator 221, which functions as a centripetal force generation actuator, and therefore, the centripetal force acting on the two steerable front wheels 14F and the one rear wheel 14R during the turn can be controlled more appropriately.

The controller 30 of the leaning vehicle 10 controls the torque outputted from the steering actuator 221, which functions as a centripetal force generation actuator, based on the turn operation inputted to the turn operation input device 18 and the in-motion state of the leaning vehicle 10 detected by the in-motion state detector while controlling the lean actuator 162 in accordance with the turn operation inputted to the turn operation input device 18, and thereby, the controller 30 controls the leaning condition of the turning vehicle body 12 and the centripetal force acting on the two steerable front wheels 14F and the one rear wheel 14R during the turn.

The information on the in-motion state of the leaning vehicle 10 is another factor used in the determination of the control of the torque outputted from the steering actuator 221, which functions as a centripetal force generation actuator, and therefore, the centripetal force acting on the two steerable front wheels 14F and the one rear wheel R during the turn can be controlled more appropriately.

The controller 30 of the leaning vehicle 10 controls the torque outputted from the steering actuator 221, which functions as a centripetal force generation actuator, based on the turn operation inputted to the turn operation input device 18, the lean angle detected by the lean angle detector 24 and the lateral acceleration detected by the lateral acceleration detector 26 while controlling the lean actuator 162 in accordance with the turn operation inputted to the turn operation input device 18, and thereby, the controller 30 controls the leaning condition of the turning vehicle body 12 and the centripetal force acting on the two steerable front wheels 14F and the one rear wheel 14R during the turn.

The lean angle of the vehicle body 12 during the turn of the leaning vehicle 10 is another factor used in the control of the torque outputted from the steering actuator 221, which functions as a centripetal force generation actuator, and therefore, the centripetal force acting on the two steerable front wheels 14F and the one rear wheel 14R during the turn can be controlled more appropriately.

The lateral acceleration that is associated with the inertial force generated during the turn of the leaning vehicle 10 is also factored into the control of the torque outputted from the steering actuator 221, which functions as a centripetal force generation actuator, and therefore, the centripetal force acting on the two steerable front wheels 14F and the one rear wheel 14R during the turn can be controlled more appropriately.

(Modification 1)

In the above-described embodiment, the ZMP position P1 and the target ZMP position P2 are on a straight line extending in the vehicle's left-right direction LR. In other words, in the above-described embodiment, the ZMP position P1 and the target ZMP position P2 are represented as one-dimensional positions. However, the ZMP position P1 and the target ZMP position P2 may be represented as two-dimensional positions.

In the present modification, the ZMP position P1 and the target ZMP position P2 are represented as two-dimensional positions. The target ZMP position P2 is set to be within a predetermined planar region.

Figure 5:
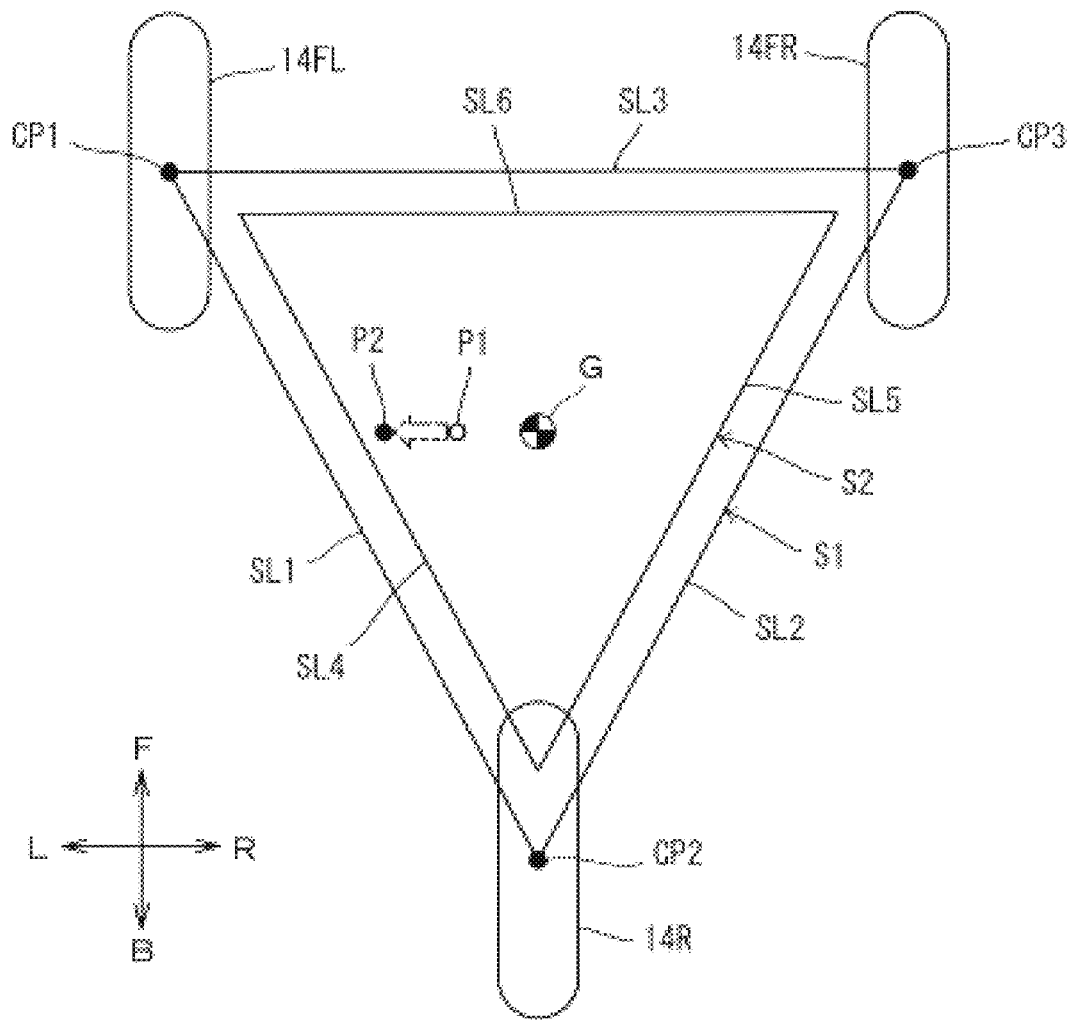
FIG. 5 is an illustration diagram showing the concept of a planar region and an inner region set in a leaning vehicle with a steerable front wheel according to Modification 1 of the embodiment and showing the ZMP position and a target ZMP position.

With reference to FIG. 5, the planar region S1 where the target ZMP position P2 stays will be described. FIG. 5 is a plan view showing the planar region S1 where the target ZMP position P2 stays.

The planar region S1 is a contact area defined by a plurality of line segments SL1, SL2 and SL3 that interconnect the contact points of the two steerable front wheels 14F and the one rear wheel 14R with the road surface. The line segment SL1 is a line segment that connects the contact point CP1 of the steerable left front wheel 14FL with the road surface and the contact point CP2 of the rear wheel 14R with the road surface. The line segment SL2 is a line segment that connects the contact point CP3 of the steerable right front wheel 14FR with the road surface and the contact point CP2 of the rear wheel 14R with the road surface. The line segment SL3 is a line segment that connects the contact point CP1 of the steerable left front wheel 14FL with the road surface and the contact point CP3 of the steerable right front wheel 14FR with the road surface. Accordingly, the planar region S1 defined by the plurality of line segments SL1, SL2 and SL3 is triangular when viewed in the vehicle's upward direction U or the vehicle's downward direction D. The points CP1, CP2 and CP3 are the centers of the areas where the respective wheels touch the road surface. In other words, the points CP1, CP2 and CP3 correspond to the centers of the respective wheels with respect to the vehicle's front-back direction FB and the vehicle's left-right direction LR when the wheels are viewed in the vehicle's upward direction U or the vehicle's downward direction D.

The planar region S1 includes an inner region S2. The inner region S2 is in the shape of a triangle that is a little smaller than the planar region S1 when viewed in the vehicle's upward direction U or the vehicle's downward direction D. Thus, the inner region S2 and the planar region S1 are similar to each other.

The inner region S2 is defined by a plurality of line segments SL4, SL5, and SL6. The line segment SL4 lies inside the planar region S1 and is parallel to the line segment SL1. The line segment SL5 lies inside the planar region S1 and is parallel to the line segment SL2. The line segment SL6 lies inside the planar region S1 and is parallel to the line segment SL3. The angle between the line segment SL4 and the line segment SL5 is equal to the angle between the line segment SL1 and the line segment SL2. The angle between the line segment SL5 and the line segment SL6 is equal to the angle between the line segment SL2 and the line segment SL3. The angle between the line segment SL6 and the line segment SL4 is equal to the angle between the line segment SL3 and the line segment SL1.

The target ZMP position P2 is set within the planar region S1. The target ZMP position P2 is set, preferably, within the inner region S2.

The target ZMP position setting section 312A of the leaning vehicle according to Modification 1 sets the target ZMP position P2 within the inner region S2. Data about the planar region S1 and the inner region S2 are, for example, stored in memory (not shown).

In the leaning vehicle according to Modification 1, the controller controls the torque outputted from the steering actuator 221 based on the turn operation inputted to the turn operation input device 18, the lean angle of the vehicle body 12 detected by the lean angle detector 24 and the lateral acceleration detected by the lateral acceleration detector 26 while controlling the position of the output member of the lean actuator 162 based on the turn operation inputted to the turn operation input device 18 such that the ZMP position P1 stays within the inner region S2. Therefore, the leaning vehicle has enhanced robustness throughout a complete turn.

(Modification 2)

Figure 6:
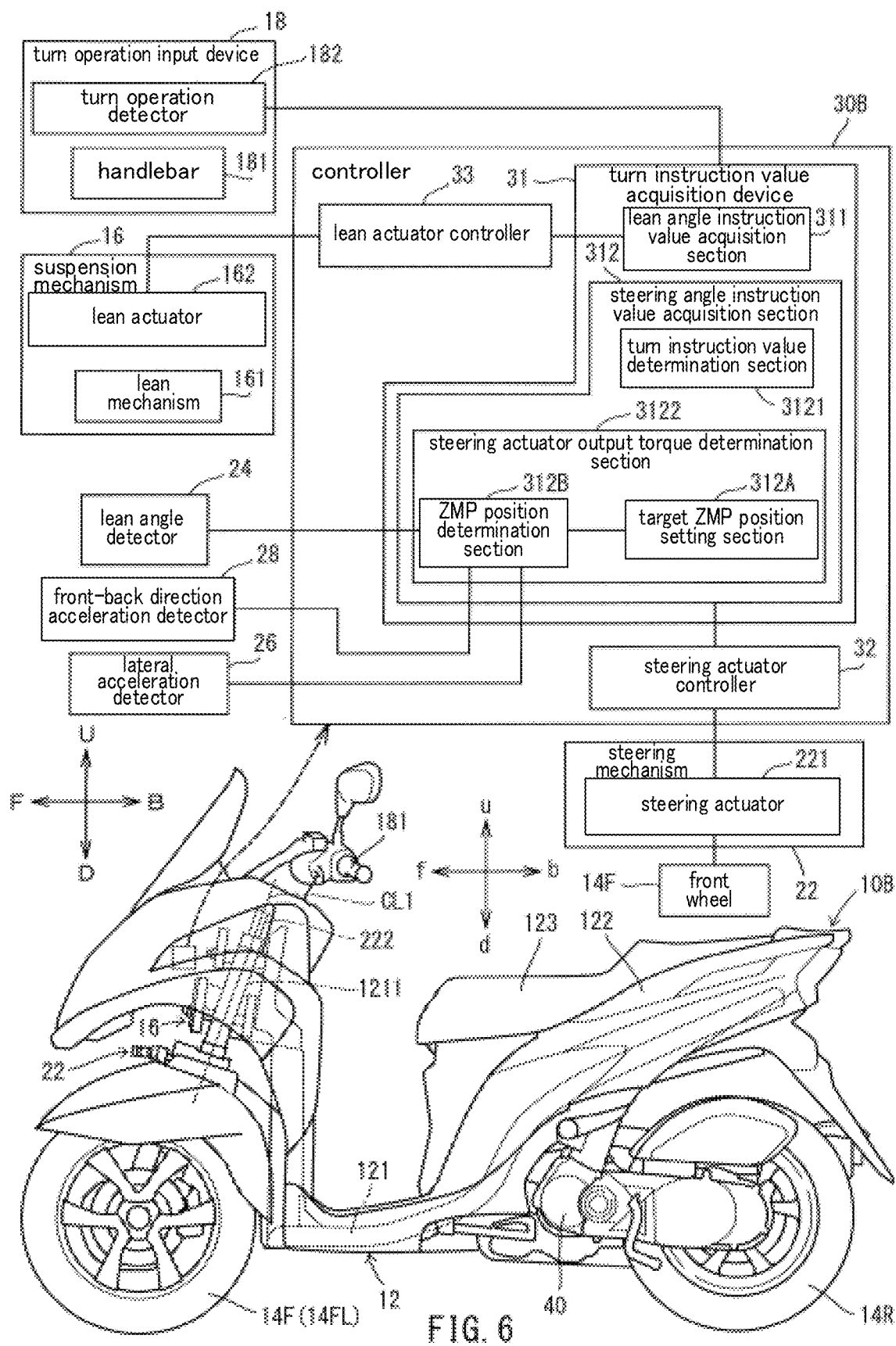
FIG. 6 is a diagram showing a left side view of a leaning vehicle with a steerable front wheel according to Modification 2 of the embodiment along with a block diagram of a controller contained in the leaning vehicle.

With reference to FIG. 6, a leaning vehicle 10B according to Modification 2 of the present embodiment will be described. FIG. 6 is a diagram showing a left side view of the leaning vehicle 10B along with a block diagram of a controller 30B contained in the leaning vehicle 10B.

As compared with the leaning vehicle 10, the leaning vehicle 10B further includes a front-back direction acceleration detector 28 that functions as an in-motion state detector. The front-back direction acceleration detector 28 detects a physical quantity relating to the front-back direction acceleration that is an acceleration of the vehicle body 12 in the vehicle's front-back direction. The front-back direction acceleration detector 28 sends the detected front-back direction acceleration to the controller 30B. The front-back direction acceleration detector 28 may be implemented, for example, by a common acceleration sensor or an inertial measurement unit (IMU).

As in the case of Modification 1, in the leaning vehicle 10B, the ZMP position P1 and the target ZMP position P2 are represented as two-dimensional positions. As in the case of Modification 1, the target ZMP position P2 is set within a predetermined planar region.

As in the case of Modification 1, in the leaning vehicle 10B, a planar region S1 and an inner region S2 as shown in FIG. 5 are defined. The target ZMP position P2 is set within the planar region S1 as shown in FIG. 5. The target ZMP position P2 is preferably set within the inner region S2.

The leaning vehicle 10B differs from the leaning vehicle 10 in that not the controller 30 but the controller 30B is contained in the leaning vehicle 10B. The controller 30B controls the lean actuator 162 in accordance with the turn operation inputted to the turn operation input device 18, and at the same time, controls the torque outputted from the steering actuator 221 based on the turn operation inputted to the turn operation input device 18, the lean angle of the vehicle body 12 detected by the lean angle detector 24, the lateral acceleration detected by the lateral acceleration detector 26 and the front-back direction acceleration detected by the front-back direction acceleration detector 28. In this way, the controller 30B controls the leaning condition of the vehicle body 12 during a turn and the centripetal force acting on the two steerable front wheels 14F and the one rear wheel 14R during the turn.

The target ZMP position setting section 312A of the leaning vehicle 10B sets the target ZMP position P2 within the inner region S2. Data about the planar region S1 and the inner region S2 are stored, for example, in memory (not shown).

In the leaning vehicle 10B, the ZMP position determination section 312B determines the current ZMP position based on the lean angle of the vehicle body 12 sent from the lean angle detector 24, the lateral acceleration sent from the lateral acceleration detector 26 and the front-back direction acceleration sent from the front-back direction acceleration detector 28. The current ZMP position may be determined, for example, by selecting and acquiring, from a reference table stored in memory (not shown), a ZMP position corresponding to the combination of the lean angle of the vehicle body 12 sent from the lean angle detector 24, the lateral acceleration sent from the lateral acceleration detector 26 and the front-back direction acceleration sent from the front-back direction acceleration detector 28. The current ZMP position may be determined, for example, by calculation using the lean angle of the vehicle body 12 sent from the lean angle detector 24, the lateral acceleration sent from the lateral acceleration detector 26 and the front-back direction acceleration sent from the front-back direction acceleration detector 28.

Next, the ZMP position control procedure carried out by the controller 30B will be described. The ZMP position control procedure carried out by the controller 30B differs from the ZMP position control procedure carried out by the controller 30 (see FIG. 4) in the processing at step S15. Specifically, at step S15 of the ZMP position control procedure carried out by the controller 30, the current ZMP position is determined based on the lean angle of the vehicle body 12 sent from the lean angle detector 24 and the lateral acceleration sent from the lateral acceleration detector 26. However, at step S15 of the ZMP position control procedure carried out by the controller 30B, the current ZMP position is determined based on the lean angle of the vehicle body 12 sent from the lean angle detector 24, the lateral acceleration sent from the lateral acceleration detector 26 and the front-back direction acceleration sent from the front-back direction acceleration detector 28.

Thus, in the leaning vehicle 10B according to Modification 2, the controller 30B controls a turn of the leaning vehicle 10B by controlling the leaning condition of the vehicle body 12 during a turn by use of the lean actuator 162, which leans the vehicle body 12 in accordance with a turn operation, and by controlling the centripetal force generated by the steering actuator 221, which functions as a centripetal force generation actuator that generates an additional centripetal force Fc2 (see FIG. 3) acting on the two steerable front wheels 14F and the one rear wheel 14R that are leaning during the turn. Therefore, the leaning vehicle 10B, in which the turn operation input device 18 is configured to not transmit the turn operation inputted by the rider mechanically, thereby preventing the leaning vehicle from swiveling due to mechanical transmission of the turn operation inputted by the rider, has enhanced robustness throughout a complete turn.

Figure 7:
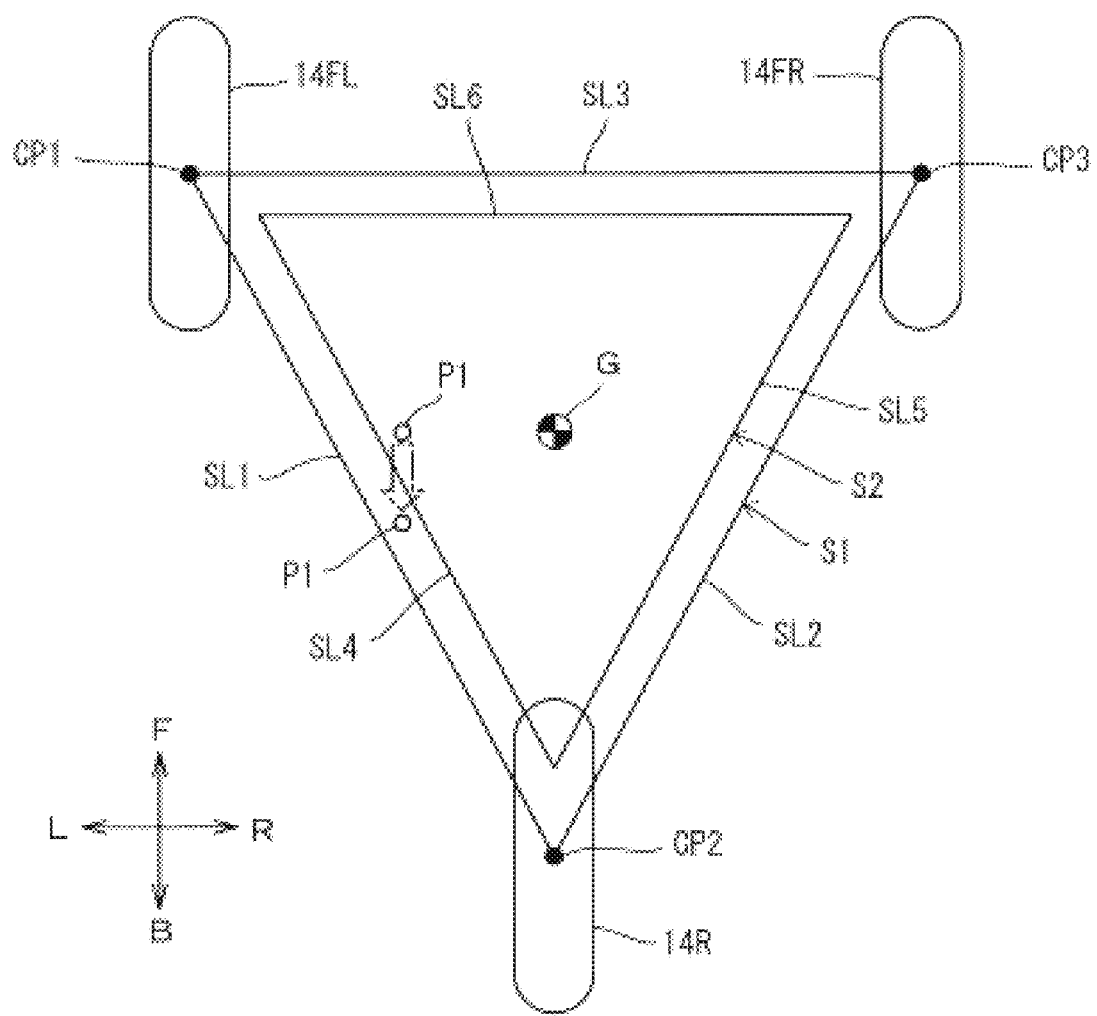
FIG. 7 is an illustration diagram showing the concept of a planar region and an inner region set in the leaning vehicle with a steerable front wheel according to Modification 2 of the embodiment and showing a state in which the ZMP position has moved out of the inner region.

In the leaning vehicle 10B according to Modification 2, when the current ZMP position P1 moves out of the inner region S2 or the planar region S1 along with a change in the vehicle speed (or when there is a probability of such a movement), the vehicle speed of the leaning vehicle 10B may be controlled such that the current ZMP position stays in the inner region S2 or the planar region S1. For example, as shown in FIG. 7, when the current ZMP position P1 moves out of the inner region S2 or the planar region S1 along with an increase in the vehicle speed, the vehicle speed of the leaning vehicle 10B may be decreased such that the current ZMP position moves back in the inner region S2 or the planar region S1.

(Modification 3)

Figure 8:
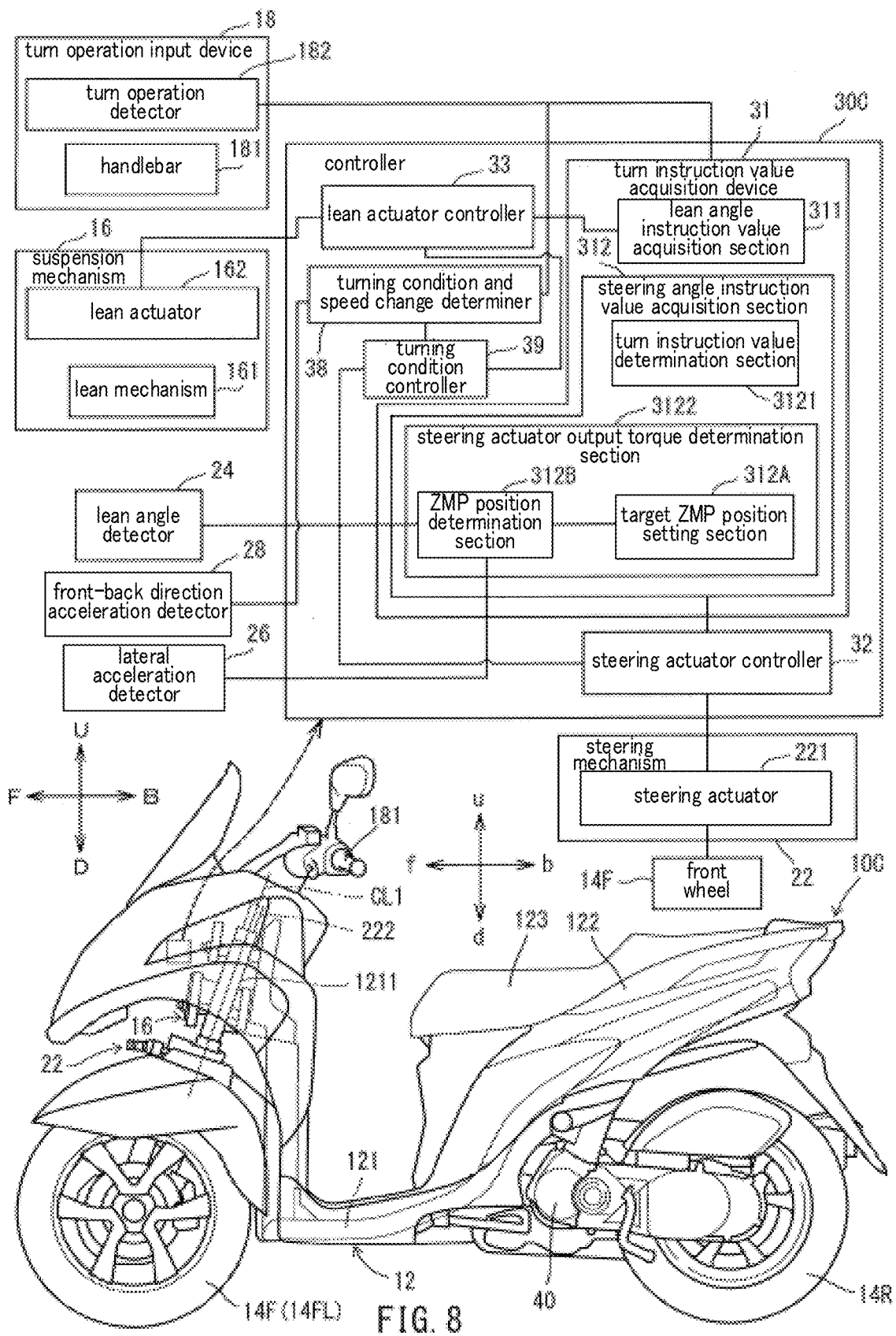
FIG. 8 is a diagram showing a left side view of a leaning vehicle with a steerable front wheel according to Modification 3 of the embodiment along with a block diagram of a controller contained in the leaning vehicle.

With reference to FIG. 8, a leaning vehicle 10C according to Modification 3 of the present embodiment will be described. FIG. 8 is a diagram showing a left side view of the leaning vehicle 10C along with a block diagram of a controller 30C contained in the leaning vehicle 10C.

As compared with the leaning vehicle 10, the leaning vehicle 10C further includes a front-back direction acceleration detector 28. As compared with the front-back direction acceleration detector 28 contained in the leaning vehicle 10B according to Modification 2, the front-back direction acceleration detector 28 provided in Modification 3 sends a front-back direction acceleration detected to a turning condition and speed change determiner 38 (which will be described later) as opposed to the ZMP position determination section 312B. The front-back direction acceleration detector 28 of the leaning vehicle 10C has no other differences from the front-back direction acceleration detector 28 of the leaning vehicle 10B. Therefore, the front-back direction acceleration detector 28 will not be described any further.

The turn operation detector 182 of the leaning vehicle 10C is different from the turn operation detector 182 of the leaning vehicle 10 in that the turn operation detector 182 of the leaning vehicle 10C sends a turn operation detected not only to the turn instruction value acquisition device 31, but also to the turning condition and speed change determiner 38 (which will be described later). The turn operation detector 182 of the leaning vehicle 10C has no other differences from the turn operation detector 182 of the leaning vehicle 10.

The leaning vehicle 10C differs from the leaning vehicle 10 in that the controller 30C is contained as opposed to the controller 30 in the leaning vehicle 10. When the vehicle speed of the leaning vehicle 10C is changed while the leaning vehicle 10 is turning in accordance with the turn operation inputted to the turn operation input device 18 remaining unchanged, the controller 30C controls the torque outputted from the steering actuator 221, which functions as a centripetal force generation actuator, while controlling the lean actuator 162 in accordance with the turn operation inputted to the turn operation input device 18 in such a manner as to change the centripetal force acting on the two steerable front wheels 14F and the one rear wheel 14R without changing the lean angle of the vehicle body 12 or in such a manner as to change the lean angle of the vehicle body 12 without changing the centripetal force acting on the two steerable front wheels 14F and the rear wheel 14R.

As compared with the controller 30, the controller 30C further includes the turning condition and speed change determiner 38 and a turning condition controller 39. The turning condition and speed change determiner 38 and the turning condition controller 39 are implemented, for example, when a CPU (central processing unit) reads a program stored in non-volatile memory and carries out specified processing within the program.

The turning condition and speed change determiner 38 determines whether the vehicle speed is changed while the turn operation remains unchanged. Specifically, when a front-back direction acceleration change is detected by the front-back direction acceleration detector 28 and the signal sent from the turn operation detector 182 (the signal indicating a turn operation) remains unchanged, the front-back direction acceleration detector sends a signal to the turning condition and speed change determiner 38 which determines that the vehicle speed is changed and the turn operation remains unchanged.

When the vehicle speed is changed while the turn operation remains unchanged, the turning condition controller 39 controls the lean actuator 162 and the steering actuator 221 to control the turning condition of the leaning vehicle 10C. Specifically, when the vehicle speed is changed while the turn operation remains unchanged, the turning condition controller 39 controls the steering actuator 221 in such a manner as to change the centripetal force acting on the two steerable front wheels 14F and the one rear wheel 14R without changing the lean angle of the vehicle body 12. Alternatively, when the vehicle speed is changed while the turn operation remains unchanged, the turning condition controller 39 controls the lean actuator 162 in such a manner as to change the lean angle of the vehicle body 12 without changing the centripetal force acting on the two steerable front wheels 14F and the one rear wheel 14R. However, the turning condition controller 39 may carry out both these controls. For example, when the vehicle speed is changed while the turn operation remains unchanged, the turning condition controller 39 may control the lean actuator 162 and the steering actuator 221 in such a manner as to change the lean angle of the vehicle body 12 and to change the centripetal force acting on the steerable front wheels 14F and the one rear wheel 14R.

Figure 9:
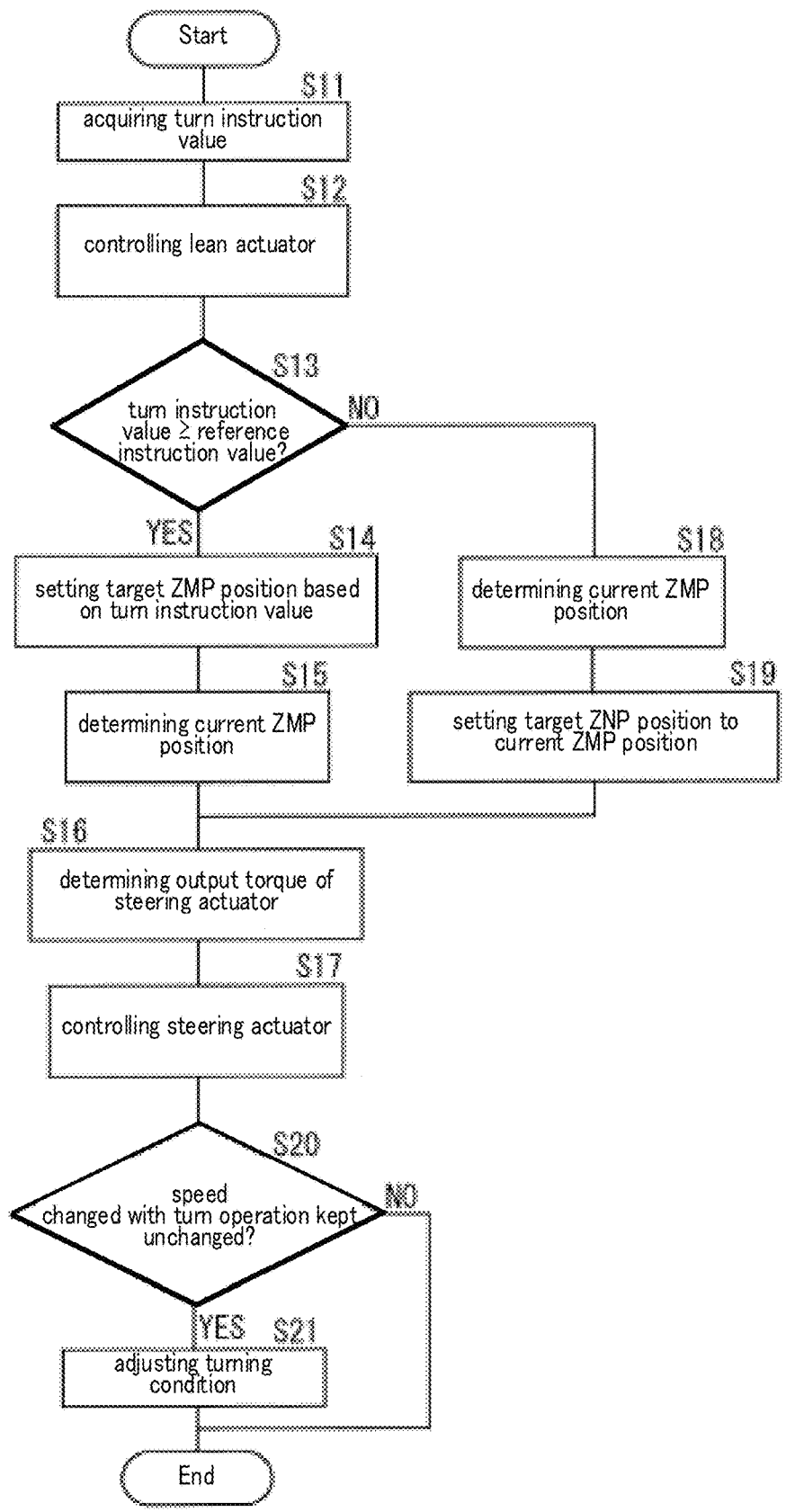
FIG. 9 is a flowchart showing a ZMP position control procedure to be carried out by the controller contained in the leaning vehicle with a steerable front wheel according to Modification 3 of the embodiment.

Next, with reference to FIG. 9, the ZMP position control procedure carried out by the controller 30C will be described. FIG. 9 is a flowchart showing the ZMP position control procedure carried out by the controller 30C.

The ZMP position control procedure carried out by the controller 30C is different from the ZMP position control procedure carried out by the controller 30 (see FIG. 4) in that additional processing steps are carried out after step S17, namely, step S20 and step S21.

At step S20, the controller 30C determines whether the vehicle speed is changed while the turn operation remains unchanged. Specifically, when a signal indicating a front-back direction acceleration is sent from the front-back direction acceleration detector 28 in a state where the signal sent from the turn operation detector 182 (the signal indicating the turn operation) is unchanged, the turning condition and speed change determiner 38 determines that the vehicle speed is changed while the turn operation remains unchanged. On the other hand, in any of the following cases (1), (2) or (3), the turning condition and speed change determiner 38 does not determine that the vehicle speed is changed while the turn operation remains unchanged.

(1) When a front-back direction acceleration is sent from the front-back-direction acceleration detector 28 while the signal sent from the turn operation detector 182 (the signal indicating the turn operation) is changed, the turning condition and speed change determiner 38 does not determine that the vehicle speed is changed while the turn operation remains unchanged.

(2) When a front-back direction acceleration is not sent from the front-back-direction acceleration detector 28 while the signal sent from the turn operation detector 182 (the signal indicating the turn operation) is changed, the turning condition and speed change determiner 38 does not determine that the vehicle speed is changed while the turn operation remain unchanged.

(3) When a front-back direction acceleration is not sent from the front-back-direction acceleration detector 28 while the signal sent from the turn operation detector 182 (the signal indicating the turn operation) remains unchanged, the turning condition and speed change determiner 38 does not determine that the vehicle speed is changed while the turn operation remains unchanged.

When it is determined that the vehicle speed is changed while the turn operation remains unchanged (YES at step S20), the controller 30C carries out the processing at step S21. When it is not determined that the vehicle speed is changed while the turn operation remains unchanged (NO at step S20), the controller 30C terminates the ZMP position control.

At step S21, the controller 30C controls the lean actuator 162 and the steering actuator 221 to control the turning condition of the leaning vehicle 10C. Specifically, the turning condition controller 39 controls the steering actuator 221 in such a manner to change the centripetal force acting on the two steerable wheels 14F and the one rear wheel 14R without changing the lean angle of the vehicle body 12. Alternatively, the turning condition controller 39 controls the lean actuator 162 in such a manner to change the lean angle of the vehicle body 12 without changing the centripetal force acting on the two steerable wheels 14F and the one rear wheel 14R. Thereafter, the controller 30C completes the ZMP position control.

In the leaning vehicle 10C according to Modification 3, as in the case of the above-described embodiment, the controller 30C controls a turn of the leaning vehicle 10C by controlling the leaning condition of the vehicle body 12 during a turn by use of the lean actuator 162, which leans the vehicle body 12 in accordance with a turn operation, and by controlling the centripetal force generated by the steering actuator 221, which functions as a centripetal force generation actuator that generates an additional centripetal force Fc2 (see FIG. 3) acting on the two steerable front wheels 14F and the one rear wheel 14R that are leaning during the turn. Therefore, the leaning vehicle 10C, in which the turn operation input device 18 is configured to not transmit the turn operation inputted by the rider mechanically and thereby prevents the two steerable front wheels 14F from swiveling due to mechanical transmission of the turn operation inputted by the rider, has enhanced robustness throughout a complete turn.

Other Embodiments

The embodiments and modifications described herein and/or illustrated by the drawings are to make the present teaching easier to understand and not to limit the concept of the present teaching. It is possible to adapt or alter the embodiments and modifications described above without departing from the gist thereof.

The gist includes all equivalent elements, modifications, omissions, combinations (for example, combinations of features of the embodiments and modifications), adaptations and alterations as would be appreciated by those in the art based on the embodiments and modifications disclosed herein. The limitations in the claims are to be interpreted broadly based on the language employed in the claims and not limited to the embodiments described in the present specification or during the prosecution of the present application. Such embodiments and modifications are to be understood as non-exclusive. For example, the terms "preferable" and "good" in the present specification are to be understood as non-exclusive, and these terms mean "preferable but not limited to this" and "good but not limited to this", respectively.

In the above-described embodiment, the leaning vehicle 10 is a three-wheeled vehicle with two steerable front wheels 14F and one rear wheel 14R. However, the leaning vehicle 10 may be, for example, a three-wheeled vehicle with a steerable front wheel set including one steerable front wheel 14F and a rear wheel set including two rear wheels 14R, or a four-wheeled vehicle with a steerable front wheel set including two steerable front wheels 14F and a rear wheel set including two rear wheels 14R.

In the above-described embodiment, the manipulable member that can be manipulated by the rider is implemented by the handlebar 181. However, the manipulable member may be, for example, a steering wheel, a jog dial, a touch panel, a press-button device, or the like.

In the above-described embodiment, a lateral acceleration detected by the lateral acceleration detector 26 is used. However, for example, a lateral acceleration that is estimated from the vehicle speed and/or the yaw rate of the leaning vehicle may be used.

In the above-described embodiment, the centripetal force generation actuator is implemented by the steering actuator 221. However, the centripetal force generation actuator may be, for example, a power unit or a brake unit as described below. The centripetal force generation actuator may be a combination of a power unit and a brake unit as described below.

(1) The power unit is a power unit that applies different amounts of torque to the respective wheels of the steerable front wheels or the rear wheels that are formed by a left wheel and a right wheel. The power unit may be formed of an engine, a transmission and a torque vectoring differential, or may be formed of an electric rotating member for the left wheel and an electric rotating member for the right wheel.

(2) The brake unit is a brake unit that applies different amounts of torque to the respective wheels of the steerable front wheels or the rear wheels that are formed by a left wheel and a right wheel. The brake unit is formed of a left brake for the left wheel and a right brake for the right wheel.

In the above-described embodiment, the steering actuator 221 may include, for example, a rack-and-pinion.

In the above-described embodiment, the lean actuator 201 may include, for example, a rack-and-pinion.

In the above-described embodiment, an additional centripetal force is generated when the lean angle of the vehicle body 12 is a predetermined lean angle limit. However, an additional centripetal force may be generated when the lean angle of the vehicle body 12 is smaller than a predetermined lean angle limit.

In Modification 3 above, even if the turn operation does not remain unchanged, the turning condition may be controlled when the vehicle speed is changed.

REFERENCE SIGNS LIST 10 leaning vehicle (leaning vehicle with a steering front wheel)
12 leaning vehicle body
121 vehicle body frame
1211 head pipe
122 vehicle body cover
123 seat
14 wheel
14F steerable front wheel
14FL steerable left front wheel
14FR steerable right front wheel
14R rear wheel
16 suspension
161 lean mechanism
1611 upper arm
1612 lower arm
1613 left member
1614 right member
162 lean actuator
163L left suspension
163R right suspension
22 steering mechanism
221 steering actuator
222 steering shaft
223 tie rod
26 lateral acceleration detector
28 front-back direction acceleration detector
30 controller
31 turn instruction value acquisition device
311 lean instruction value acquisition section
312 steering instruction value acquisition section
32 steering actuator controller
33 lean actuator controller

The invention claimed is:

1. A leaning vehicle, comprising:
a vehicle body;
a steerable front wheel set that is supported by the vehicle body in such a manner so as to be swivelable around an axis extending in an up-down direction of the vehicle body;
a rear wheel set that is supported by the vehicle body in such a manner so as to be unswivelable around any axis extending in the up-down direction of the vehicle body, the steerable front wheel set and the rear wheel set being so arranged that
  the rear wheel set includes two rear wheels, and the steerable front wheel set include one steerable front wheel, or
  the rear wheel set includes one or two rear wheels, and the steerable front wheel set includes two steerable front wheels;
a turn operation input device that receives a turn operation to turn the leaning vehicle from a rider of the leaning vehicle, and that is configured to transmit the turn operation in a non-mechanical manner, thereby preventing the steerable front wheel set from swiveling due to mechanical transmission of the turn operation;
a leaning device including a lean actuator that leans the vehicle body, the steerable front wheel set and the rear wheel set
  to a leftward direction of the leaning vehicle, when the received turn operation is to turn the leaning vehicle in the leftward direction, and
  to a rightward direction of the leaning vehicle, when the received turn operation is to turn the leaning vehicle in the rightward direction;
a steering mechanism including a steering actuator that is configured to apply a torque to the steerable front wheel set in accordance with the received turn operation, thereby causing the steerable front wheel set to swivel around the axis;
a controller that controls the lean actuator and the steering actuator; and
a centripetal force generator including a centripetal force generation actuator, the centripetal force generation actuator outputting another torque that is controllable, to thereby generate an additional centripetal force that acts on the steerable front wheel set and the rear wheel set during a turn of the leaning vehicle, wherein
the controller is configured
  to acquire a turn instruction information that indicates contents of the received turn operation, and that includes a lean instruction information and a steering instruction information,
  to control the lean actuator to lean the vehicle body, the steerable front wheel set and the rear wheel set in accordance with the lean instruction information included in the turn instruction information,
  to control the steering actuator to apply the torque to the steerable front wheel set to steer in accordance with the steering instruction information included in the turn instruction information, and
  to thereby control the another torque outputted from the centripetal force generation actuator during the turn of the leaning vehicle while leaning the steerable front wheel set and the rear wheel set, to thereby control a leaning condition of the vehicle body during the turn of the leaning vehicle and to control generation of the additional centripetal force, wherein the additional centripetal force is added to a centripetal force generated along with the turn of the leaning vehicle, to thereby cause the centripetal force acting on the steerable front wheel set and the rear wheel set that are leaning during the turn of the leaning vehicle to further increase.

2. The leaning vehicle according to claim 1, wherein the lean actuator includes an output member, and the controller controls the torque outputted from the centripetal force generation actuator while controlling a position of the output member of the lean actuator in accordance with the received turn operation, to thereby control a lean angle of the vehicle body during the turn of the leaning vehicle and the generation of the centripetal force.

3. The leaning vehicle according to claim 1, wherein the controller controls the torque outputted from the centripetal force generation actuator in accordance with the received turn operation.

4. The leaning vehicle according to claim 3, wherein:

the turn operation input device includes a manipulable member that is swivelable by the rider; and the controller controls the torque outputted from the centripetal force generation actuator in accordance with a swivel angle of the manipulable member of the turn operation input device.

5. The leaning vehicle according to claim 1, further comprising an in-motion state detector that detects a physical quantity relating to an in-motion state of the leaning vehicle, wherein the controller controls the torque outputted from the centripetal force generation actuator in view of the in-motion state detected by the in-motion state detector.

6. The leaning vehicle according to claim 5, wherein the physical quantity relating to the in-motion state of the leaning vehicle includes any of:

(1) a physical quantity relating to a lean angle of the vehicle body;

(2) a physical quantity relating to a vehicle speed of the leaning vehicle; and (3) a physical quantity relating to a lateral acceleration of the leaning vehicle, the lateral acceleration being an acceleration of the vehicle body in a left-right direction of the leaning vehicle.

7. The leaning vehicle according to claim 6, wherein;

the in-motion state detector is a lateral acceleration detector that detects the physical quantity relating to the lateral acceleration of the leaning vehicle; and the controller controls the torque outputted from the centripetal force generation actuator in view of the lateral acceleration detected by the lateral acceleration detector.

8. The leaning vehicle according to claim 1, wherein:

each of the at least one steerable front wheel and the at least one rear wheel touches a road surface at a contact point, an area delimited by line segments that interconnect the contact points being defined as a contact area;

a position of an intersection point between an imaginary line and the road surface is a Zero Moment Point (ZMP) position, the imaginary line passing through a center of mass of the leaning vehicle, and being parallel to a direction of a resultant force of gravity and an inertial force, which both act on the center of mass of the leaning vehicle; and the controller controls the torque outputted from the centripetal force generation actuator while controlling the lean actuator in accordance with the received turn operation, such that the ZMP position stays within the contact area.

9. The leaning vehicle according to claim 8, further comprising:

a lateral acceleration detector that detects a physical quantity relating to a lateral acceleration of the vehicle body in a left-right direction of the leaning vehicle, or a front-back direction acceleration detector that detects a physical quantity relating to a front-back direction acceleration of the vehicle body in a front-back direction of the leaning vehicle; wherein the controller controls the torque outputted from the centripetal force generation actuator in view of the lateral acceleration detected by the lateral acceleration detector or the front-back direction acceleration detected by the front-back direction acceleration detector.

10. The leaning vehicle according to claim 1, wherein, when a vehicle speed of the leaning vehicle changes while the leaning vehicle is turning yet the received turn operation remains unchanged, the controller controls the torque outputted from the centripetal force generation actuator while controlling the lean actuator in accordance with the received turn operation, in such a manner as to change the additional centripetal force without changing a lean angle of the vehicle body, or as to change the lean angle of the vehicle body without changing the additional centripetal force.

11. The leaning vehicle according to claim 1, wherein, when a lean angle of the vehicle body is at a predetermined lean angle limit while the leaning vehicle is turning in accordance with the received turn operation, the controller controls the torque outputted from the centripetal force generation actuator while controlling the lean actuator in accordance with the received turn operation, in such a manner as to increase the additional centripetal force without changing the lean angle of the vehicle body.

12. The leaning vehicle according to claim 1, wherein the lean actuator is a rotating electric machine having an output member, the rotating electric machine rotating the output member in a first direction to lean the vehicle body to the leftward direction, when the received turn operation is to turn the leaning vehicle to the leftward direction, and rotating the output member in a second direction to lean the vehicle body the rightward direction, when the received turn operation is to turn the leaning vehicle to the rightward direction.

13. The leaning vehicle according to claim 1, wherein the centripetal force generation actuator is any one of the following: (a), (b), (c), a combination of (a) and (b), a combination of (a) and (c), a combination of (b) and (c), or a combination of (a), (b) and (c), wherein (a) is the steering actuator, which is a rotating electric machine, is mechanically connected to the steerable front wheel set, rotates in a third direction to apply a first torque to swivel the steerable front wheel set in a fifth rotation direction, and rotates in a fourth direction to apply a second torque to swivel the steerable front wheel set in a sixth rotation direction;

(b) is a power unit that applies different amounts of torque to respective wheels of a left wheel and a right wheel in the steerable front wheel set or the rear wheel set; and
(c) is a brake unit that applies different amounts of torque to the respective wheels of the left wheel and the right wheel.

\* \* \* \* \*